United States Patent
Teraoka et al.

(10) Patent No.: US 9,435,394 B2
(45) Date of Patent: Sep. 6, 2016

(54) DAMPING DEVICE

(75) Inventors: Takashi Teraoka, Kani (JP); Kazutaka Inamitsu, Kani (JP)

(73) Assignee: KYB Corporation, Tokyo (JP)

( * ) Notice: Subject to any disclaimer, the term of this patent is extended or adjusted under 35 U.S.C. 154(b) by 427 days.

(21) Appl. No.: 13/514,897

(22) PCT Filed: Dec. 9, 2010

(86) PCT No.: PCT/JP2010/072156
§ 371 (c)(1),
(2), (4) Date: Jun. 8, 2012

(87) PCT Pub. No.: WO2011/071120
PCT Pub. Date: Jun. 16, 2011

(65) Prior Publication Data
US 2012/0234639 A1    Sep. 20, 2012

(30) Foreign Application Priority Data

Dec. 11, 2009  (JP) .................. 2009-281220
Sep. 10, 2010  (JP) .................. 2010-202718

(51) Int. Cl.
*F16F 9/50*  (2006.01)
*F16F 9/512*  (2006.01)
*F16F 9/348*  (2006.01)

(52) U.S. Cl.
CPC ............. *F16F 9/5126* (2013.01); *F16F 9/348* (2013.01)

(58) Field of Classification Search
CPC .......... F16F 9/504; F16F 9/348; F16F 9/5126
USPC ............................ 188/280, 322.22, 322.15
See application file for complete search history.

(56) References Cited

U.S. PATENT DOCUMENTS

| | | | |
|---|---|---|---|
| 5,248,014 A * | 9/1993 | Ashiba | 188/282.8 |
| 5,386,892 A * | 2/1995 | Ashiba | 188/282.8 |
| 6,318,523 B1 * | 11/2001 | Moradmand et al. | 188/280 |
| 7,954,609 B2 * | 6/2011 | Chikamatsu et al. | 188/280 |

FOREIGN PATENT DOCUMENTS

| | | |
|---|---|---|
| JP | 6-67943 U | 9/1994 |
| JP | H07-077233 A | 3/1995 |
| JP | H08-135715 A | 5/1996 |
| JP | H11-173364 A | 6/1999 |
| JP | 2001-027274 A | 1/2001 |
| JP | 2006-292041 A | 10/2006 |
| JP | 2006-336816 A | 12/2006 |
| JP | 2007-078004 A | 3/2007 |
| JP | 2008-106926 A | 5/2008 |

* cited by examiner

*Primary Examiner* — Bradley King
(74) *Attorney, Agent, or Firm* — Rabin & Berdo, P.C.

(57) ABSTRACT

A damping device comprises a piston that partitions an interior of a cylinder into first and second working chambers. A flow-rate-dependent damping force generating element connects the first and second working chambers. A first pressure chamber and a second pressure chamber divided by a free piston are formed integrally with the piston. A first connecting passage connects the first working chamber and the first pressure chamber, and a second connecting passage connects the second working chamber and the second pressure chamber. By providing a relief valve that allows fluid to flow from the first working chamber into the second working chamber, an increase in the generated damping force during a high speed operation of the piston can be suppressed, regardless of a vibration frequency of the piston.

33 Claims, 18 Drawing Sheets

DAMPING DEVICE

FIELD OF THE INVENTION

This invention relates to an arrangement of a damping force generating member of a damping device.

BACKGROUND OF THE INVENTION

JP2006-336816A and JP2007-078004A, published by the Japan Patent Office in 2006 and 2007, respectively, disclose a damping device comprising an upper chamber and a lower chamber defined as working chambers by a piston housed in a cylinder, a first passage that penetrates the piston in order to connect the upper chamber and the lower chamber under a predetermined flow resistance, a pressure chamber formed in the piston, a free piston that partitions the pressure chamber into an upper pressure chamber that communicates with the upper chamber and a lower pressure chamber that communicates with the lower chamber, and a coil spring that supports the free piston elastically.

The pressure chamber does not connect the upper chamber and the lower chamber directly, but when the free piston displaces, a volume ratio between the upper pressure chamber and the lower pressure chamber varies. More specifically, a working fluid moves between the upper chamber and the upper pressure chamber and between the lower chamber and the lower pressure chamber. As a result, the pressure chamber functions as a second passage that substantially connects the upper chamber and the lower chamber.

When a differential pressure between the upper chamber and the lower chamber, generated as the damping device expands and contracts, is set as P and a flow rate flowing out of the upper chamber is set as Q, a transfer function G (s) of the differential pressure P relative to the flow rate Q is determined from a following Equation (1).

$$G(s) = \frac{C1 \cdot 1 + A^2 \cdot \frac{(C2+C3)s}{K}}{1 + A^2 \frac{(C1+C2+C3)s}{K}} \quad (1)$$

where:
Q1 is a flow rate of he firs passage;
C1 is a coefficient indicating a relationship between he differential pressure P and he flow rate Q1;
P1 is a pressure of he upper pressure chamber;
P2 is a pressure of he lower pressure chamber;
Q2 is an inflow flow rate from he upper chamber into he upper pressure chamber and an outflow flow rate from he lower pressure chamber into he lower chamber;
C2 is a coefficient indicating a relationship between he flow rate Q2 and a difference between he differential pressure P and he pressure P1;
C3 is a coefficient indicating a relationship between he pressure P2 and he flow rate Q2;
A is a pressure receiving surface area of he free piston;
K is a spring constant of he coil spring; and
s is a Laplacian operator.

By substituting jω for the Laplacian operator s in Equation (1) and determining an absolute value of a frequency transfer function G (jω), Equation (2) is obtained.

$$|G(j\omega)| = \frac{C1K^4 + K^2 \cdot A^4 \{2 \cdot (C2+C3) \cdot (C1+C2+C3) + C1^2\} \cdot}{K^2 + A^4 \cdot (C1+C2+C3)^3 \cdot \omega^2} \quad (2)$$

As is evident from Equations (1) and (2), a frequency characteristic of the transfer function of the differential pressure P relative to the flow rate Q has a cutoff frequency Fa expressed by a following Equation (3) and a cutoff frequency Fb expressed by a following Equation (4).

$$Fa = \frac{K}{\{2 \neq A^2 \cdot (C1+C2+C3)\}} \quad (3)$$

$$Fb = \frac{K}{\{2 \neq A^2 \cdot (C2+C3)\}} \quad (4)$$

Referring to FIG. 21, a transfer gain is substantially equal to C1 in a frequency region F<Fa, gradually decreases from C1 to C1·(C2+C3)/(C1+C2+C3) in a region Fa≤F≤Fb, and becomes constant in a region F>Fb. In other words, the frequency characteristic of the transfer function of the differential pressure P relative to the flow rate Q has a large transfer gain in a low frequency region and a small transfer gain in a high frequency region.

Referring to FIG. 22, this damping device generates a large damping force relative to low frequency vibration input and a small damping force relative to high frequency vibration input. This characteristic contributes to realization of a favorable level of passenger comfort when the damping device is used in a vehicle. The reason for this is that low frequency vibration input such as centrifugal force that acts as the vehicle turns is absorbed by the large damping force, while high frequency vibration input such as that generated by irregularities on a road surface as the vehicle travels is damped by the small damping force.

SUMMARY OF THE INVENTION

To generate a large damping force in response to low frequency vibration and a small damping force in response to high frequency vibration, an orifice is provided in the second passage of the damping device according to the prior art. The orifice has a flow rate characteristic according to which an increase in the flow rate leads to a dramatic increase in flow resistance. It may therefore be impossible to realize the desired characteristic whereby a small damping force is generated in response to high frequency vibration when, for example, the vehicle travels over an irregularity on the road surface such that the piston displaces at an extremely high speed, causing a passage resistance of the orifice to increase greatly beyond a passage resistance of the first passage.

It is therefore an object of this invention to provide a damping device in which an increase in a damping force generated when a piston operates at a high speed can be suppressed, regardless of a frequency of vibration input into the piston.

In order to achieve the above object, a damping device according to this invention comprises a cylinder, a piston that is accommodated in the cylinder to be free to slide and divides an interior of the cylinder into a first working chamber and a second working chamber, a damping force generating element that connects the first working chamber and the second working chamber, a hollow portion partitioned by a free piston into a first pressure chamber and a second pressure chamber, a first connecting passage that connects the first working chamber and the first pressure chamber, a second connecting passage that connects the second working chamber and the second pressure chamber, a bypass passage that connects the first connecting passage and the second working chamber, and a relief valve that is provided in the bypass passage and allows the fluid to flow from the first working chamber into the second working chamber when a differential pressure between the first working chamber and the second working chamber exceeds a relief pressure.

The details as well as other features and advantages of this invention are set forth in the remainder of the specification and are shown in the accompanying drawings.

DESCRIPTION OF THE PREFERRED EMBODIMENTS

Figure 1:
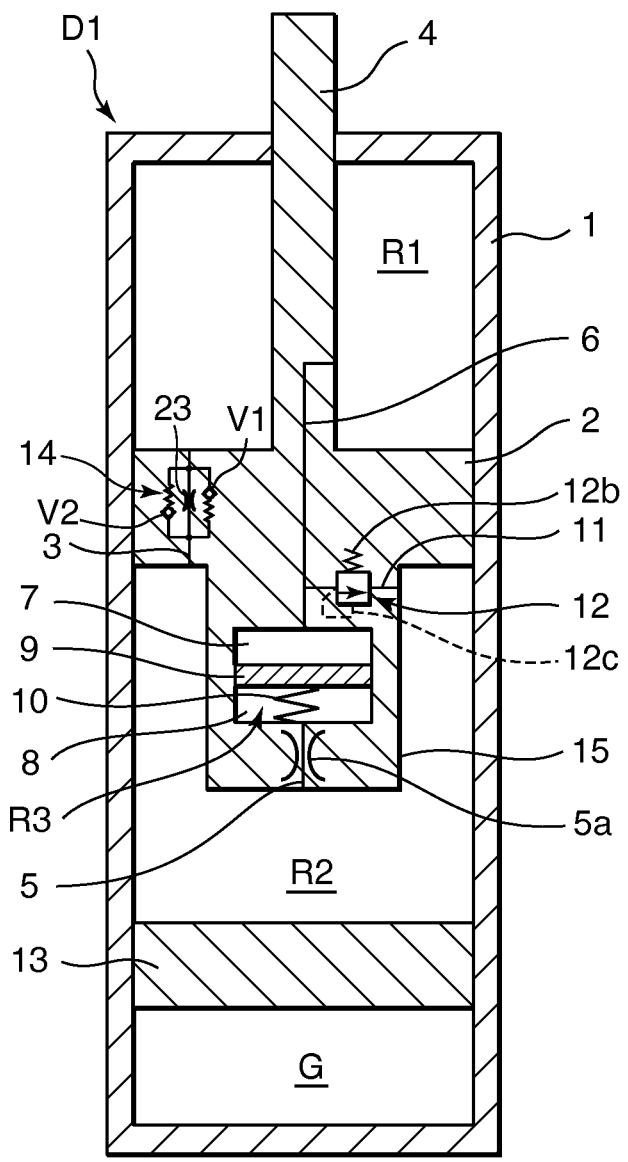
FIG. 1 is a schematic longitudinal sectional view of a damping device according to a first embodiment of this invention.

Referring to FIG. 1 of the drawings, a damping device D1 interposed between a vehicle body and an axle of a vehicle comprises a cylinder 1 and a piston 2 inserted into the cylinder 1 to be free to slide in an axial direction. An interior of the cylinder 1 is partitioned by the piston 2 into an upper chamber R1 serving as a first working chamber and a lower chamber R2 serving as a second working chamber. The upper chamber R1 and the lower chamber R2 are connected by a passage 3 that penetrates the piston 2. A damping force generating element 14 that generates a damping force is provided in the passage 3. The damping force generating element 14 has a flow rate-dependent damping characteristic according to which the damping force generated thereby increases in response to an increase in flow rate. Here, the damping force generating element 14 is constituted by a known damping mechanism in which an orifice 23 and leaf valves V1, V2 are disposed in parallel. A combination of a choke and a leaf valve may be used as the damping force generating element 14. Further, the damping force generating element 14 may be constituted by another flow rate-dependent damping force generating element.

A projecting portion 15 that projects into the lower chamber R2 is formed on the piston 2. A cylindrical hollow portion R3 is formed in the projecting portion 15 in the axial direction of the cylinder 1. A free piston 9 is housed in the hollow portion R3. The free piston 9 partitions the hollow portion R3 into an upper pressure chamber 7 serving as a first pressure chamber and a lower pressure chamber 8 serving as a second pressure chamber.

The upper pressure chamber 7 is connected to the upper chamber R1 via a connecting passage 6 serving as a first connecting passage. Further, a bypass passage 11 that bifurcates from the connecting passage 6 midway and extends to the lower chamber R2 is provided in the projecting portion 15. A relief valve 12 is provided in the bypass passage 11.

The lower pressure chamber 8 is connected to the lower chamber R2 via a connecting passage 5 serving as a second connecting passage. An orifice 5a is provided in the connecting passage 5.

The free piston 9 is elastically supported by a spring 10.

A gas chamber G is defined below the lower chamber R2 in the cylinder 1 via a free piston 13.

A fluid such as working oil is charged into the cylinder 1 above the free piston 13. Water or an aqueous solution, for example, may be used as the fluid instead of working oil.

The piston 2 is joined to a tip end of a piston rod 4 that is inserted into the cylinder 1 from the axial direction to be free to slide. A sealing member is interposed between the piston rod 4 and the cylinder 1. As a result, the cylinder 1 remains in a watertight condition when the piston rod 4 slides.

The damping device D1 is a so-called single rod type in which expansion and contraction of the damping device D1, or in other words variation in an internal volume of the cylinder 1 occurring as the piston rod 4 intrudes into and retreats from the cylinder 1, is absorbed by causing the free piston 13 to slides through the cylinder 1 in accordance with expansion and contraction of a gas in the gas chamber G.

Instead of providing the free piston 13 and the gas chamber G in the cylinder 1, a reservoir into which gas and working oil are sealed may be provided on an outer side of the cylinder 1 such that volume variation in the cylinder 1 accompanying expansion and contraction of the damping device D1 is absorbed by expansion and contraction of the gas in the reservoir. Further, the damping device D1 may be constituted by a double rod type device, and in this case, the reservoir and the gas chamber G may be omitted.

When the damping device D1 configured as described above is in a neutral condition where no expansion/contraction direction load acts between the piston rod 4 and the cylinder 1, the free piston 9 is maintained in a neutral position within the hollow portion R3 by the spring 10 provided in the hollow portion R3. The neutral position does not necessarily have to be an intermediate point of the hollow portion R3 in the axial direction.

In the damping device D1, the free piston 9 slides in an opposite direction to a displacement direction of the piston 2. More specifically, when the damping device D1 contracts, the piston 2 displaces downward in the figure through the cylinder 1. At this time, the working oil in the contracting lower chamber R2 flows into the lower pressure chamber 8, and as a result, the free piston 9 displaces upward in the figure relative to the piston 2. When the damping device D1 expands, the piston 2 displaces upward in the figure through the cylinder 1. At this time, the working oil in the contracting upper chamber R1 flows into the upper pressure chamber 7, and as a result, the free piston 9 displaces downward in the figure relative to the piston 2.

It should be noted that when the entire damping device D1 displaces in an up-down direction of the figure, up-down direction vibration may be excited in the free piston 9. To eliminate this possibility, the direction in which the free piston 9 slides through the hollow portion R3 should be set at an orthogonal direction to the expansion/contraction direction of the damping device D, or in other words a left-right direction in the figure. More specifically, the hollow portion R3 is formed in a cylindrical shape having a central axis in the left-right direction of the figure, while the first pressure chamber 8 and the second pressure chamber 7 are formed respectively on the left and right of the free piston 9 housed in the hollow portion R3.

When the damping device D1 expands and contracts such that a relative displacement speed of the piston 2 to the cylinder 1 increases, a differential pressure between the upper chamber R1 and the lower chamber R2 increases, leading to an increase in a flow rate of the connecting passage 5. Accordingly, a flow resistance exerted on the working oil flow by the orifice 5a increases dramatically. An increase also occurs in the flow rate of the working oil attempting to move from the lower pressure chamber 8 into the lower chamber R2 or from the lower chamber R2 into the lower pressure chamber 8, leading to a dramatic increase in the flow resistance applied by the orifice 5a. The reason for this is that an orifice typically has a tendency to increase the flow resistance at an accelerated rate relative to a flow rate increase.

In the damping device D1, the relief valve 12 provided in the bypass passage 11 suppresses an increase in the damping force when the relative displacement speed of the piston 2 to the cylinder 1 increases during an expansion stroke of the damping device D1.

The relief valve 12 comprises a spring 12b that biases a valve body in a direction for closing the bypass passage 11, and a pilot passage 12c that exerts a pressure of the connecting passage 6 on the valve body against a biasing force of the spring 12b. The pressure of the connecting passage 6 is equal to a pressure of the upper chamber R1. A differential pressure between the connecting passage 6 and the lower chamber R2 increases as the relative displacement speed of the piston 2 to the cylinder 1 increases during expansion of the damping device D1. When this differential pressure exceeds the biasing force of the spring 12b, the relief valve 12 lifts the valve body against the spring 12b, thereby opening the bypass passage 11 such that the working oil flows into the lower chamber R2 through the connecting passage 6. After opening, the relief valve 12 has a flow rate-independent damping characteristic according to which an increase in the generated damping force is small relative to an increase in the flow rate. In other words, the increase in the generated damping force relative to an increase in the flow rate is smaller in the relief valve 12 than in the damping force generating element 14.

The relief valve 12 may be structured to open and close in accordance with the pressure of the connecting passage 6 alone rather than the differential pressure between the connecting passage 6 and the lower chamber R2.

Next, the damping force generated during the expansion stroke of the damping device D1 will be described.

First, a case in which the speed at which the piston 2 moves through the cylinder 1 is low such that the relief valve 12 is closed will be described.

When the piston 2 displaces relative to the cylinder 1 in the up-down direction of the figure, one of the upper chamber R1 and the lower chamber R2 is caused to contract by the piston 2, while the other is caused to expand. A pressure in the contraction side chamber increases, whereas a pressure in the expansion side chamber decreases, and therefore a differential pressure is generated between the two chambers such that the working oil in the contraction side chamber moves into the expansion side chamber. The working oil moves through the passage 3 and a passage constituted by the connecting passage 6, the upper pressure chamber 7, the lower pressure chamber 8, and the connecting passage 5.

Next, the damping force generated in a case where the piston speed remains constant at a high speed during the expansion stroke of the damping device D1 will be described.

When the piston speed is constant, an amplitude of vibration increases as the frequency of the vibration decreases. In this case, the amount of working oil that flows into the lower chamber R2 from the upper chamber R1 per vibration period increases, and the displacement of the free piston 9 increases substantially commensurately with the amount of oil. The free piston 9 is biased by the spring 10, and therefore, when the displacement of the free piston 9 increases, a spring load of the spring 10 received by the free piston 9 also increases. The pressure in the lower pressure chamber 8 decreases below the pressure in the upper pressure chamber 7 by an amount corresponding to the spring load. When the pressure in the lower pressure chamber 8 decreases, the differential pressure between the lower pressure chamber 8 and the lower chamber R2 decreases, leading to a reduction in the flow rate of the working oil flowing out of the lower pressure chamber 8 into the lower chamber R2 through the orifice 5*a*. The reduction in the flow rate through the orifice 5*a* corresponds to an increase in the flow rate through the passage 3, and therefore the damping force generated by the damping device D1 remains large.

Meanwhile, when the piston speed is constant, the amplitude of the vibration decreases as the frequency of the vibration increases. In this case, the amount of working oil that moves into the lower chamber R2 from the upper chamber R1 per vibration period decreases, and the displacement of the free piston 9 decreases substantially commensurately with the amount of oil. When the displacement of the free piston 9 decreases, the spring load of the spring 10 received by the free piston 9 also decreases. As a result, the pressure in the lower pressure chamber 8 and the pressure in the upper pressure chamber 7 become substantially equal. Accordingly, the differential pressure between the lower pressure chamber 8 and the lower pressure R2 remains large, and therefore the flow rate through the orifice 5*a* exceeds the flow rate generated by low frequency vibration. The flow rate through the passage 3 decreases correspondingly, leading to a reduction in the damping force generated by the damping device D1.

Figure 2:
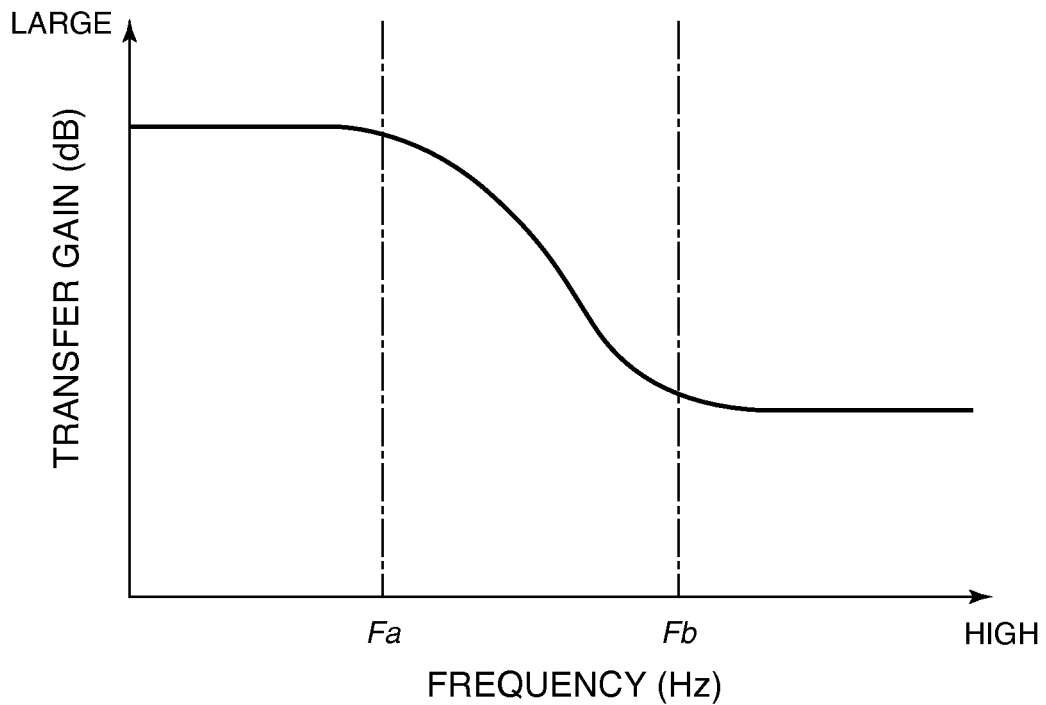
FIG. 2 is a diagram showing a gain characteristic of a frequency transfer function of a differential pressure relative to a working oil flow rate of the damping device.

Referring to FIG. 2, a gain characteristic of a frequency transfer function of the differential pressure relative to the flow rate in a case where the piston speed of the damping device D1 is low can be expressed by Equation (2), similarly to the prior art.

Figure 3:
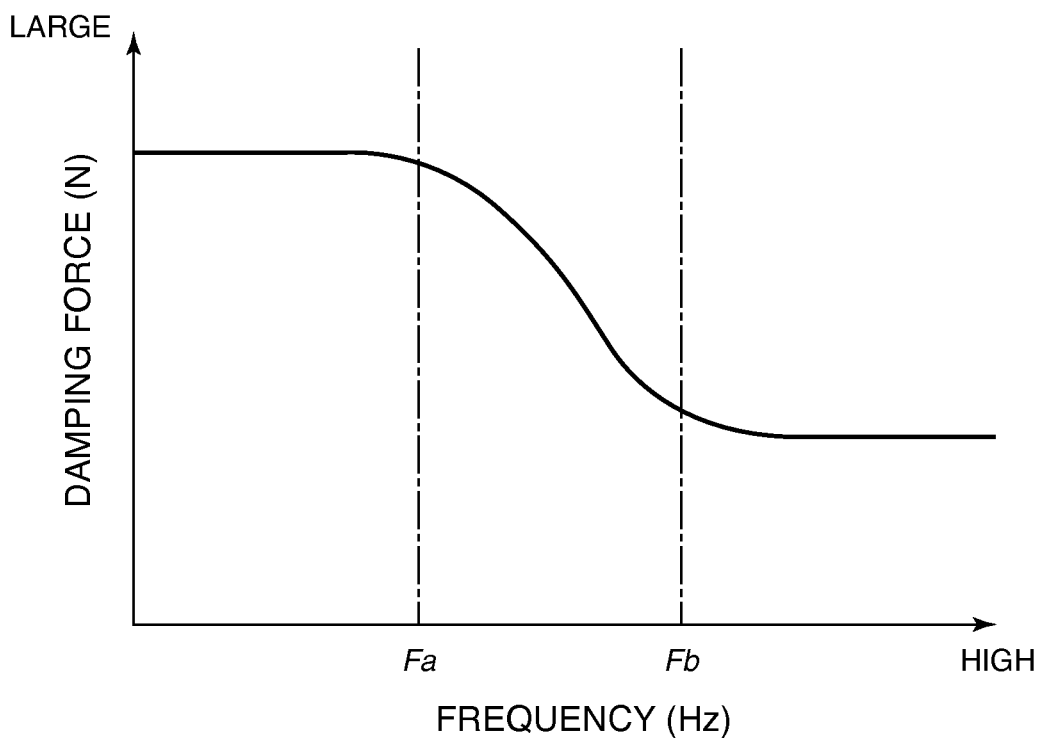
FIG. 3 is a diagram showing a characteristic of a generated damping force relative to a frequency of vibration input into the damping device.

Referring to FIG. 3, the generated damping force relative to the input vibration frequency in the damping device D1 is large in relation to vibration in a low frequency region and small in relation to vibration in a high frequency region. Hence, the damping force generated by the damping device D1 can be varied in accordance with the input vibration frequency.

During a contraction stroke of the damping device D1, similarly to the expansion stroke described above, a large damping force is generated in response to vibration in the low frequency region and a reduced damping force is generated in response to vibration in the high frequency region. In other words, the damping force generated by the damping device D1 is varied in accordance with the input vibration frequency.

The characteristics described above are identical to those of the damping device according to the prior art.

Figure 5:
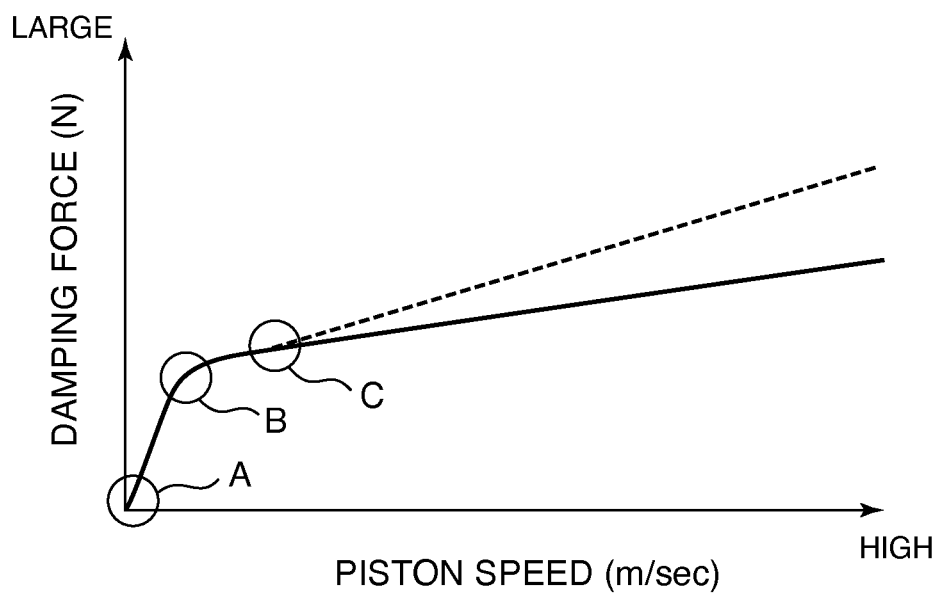
FIG. 5 is a diagram illustrating a relationship between the piston speed and the damping force generated by the damping device at a constant vibration frequency.

Next, referring to FIG. 5, a relationship between the piston speed and the damping force generated by the damping device D1 will be described.

When the piston 2 of the damping device D1 is at an extremely low speed, damping force is generated by the orifice 23 of the damping force generating element 14 provided in the passage 3 and the orifice 5*a* of the connecting passage 5. In accordance with the unique flow rate characteristic of an orifice, the generated damping force increases dramatically together with the piston speed, as indicated by a section extending from a portion A to a portion B in the figure. When the piston speed reaches the portion B of the figure, the leaf valve of the damping force generating element 14 opens. When the piston speed increases further so as to reach a portion C of the figure, the relief valve 12 opens.

As shown by a dotted line in the figure, the damping force generated by the damping device according to the prior art, which is not provided with the relief valve 12, increases in accordance with the damping characteristic of the leaf valve, which is a flow rate-dependent damping characteristic, in a higher piston speed region than the portion B of the figure.

When the vehicle travels over an irregularity in the road surface, for example, such that rapid and large-amplitude vibration is input into the damping device D1, the movement speed of the piston 2 relative to the cylinder 1 increases regardless of the input vibration frequency. In this case, the flow rate from the upper chamber R1 to the lower chamber R2 increases such that the flow resistance exerted on the working oil flow by the orifice 5*a* greatly exceeds the flow resistance exerted on the working oil flow through the passage 3.

In the damping device according to the prior art in this case, the working oil attempts to move from the upper chamber R1 to the lower chamber R2 through the passage 3 alone. In other words, the damping force generated by the damping device increases together with the piston speed in accordance with the characteristic of the leaf valve of the damping force generating element 14, as shown by the dotted line in the figure.

When the piston 2 performs an expansion operation at a high speed in the damping device D1, on the other hand, the increased pressure in the upper chamber R1 pushes open the relief valve 12 via the connecting passage 6 such that the working oil flows out of the upper chamber R1 into the lower chamber R2 through the bypass passage 11.

In other words, the working oil moves from the upper chamber R1 to the lower chamber R2 through the connecting passage 6 and the bypass passage 11 in addition to the passage 3, and therefore the damping force generated by the damping device D1 on the expansion side can be suppressed, as shown by a solid line in the figure.

Figure 4:
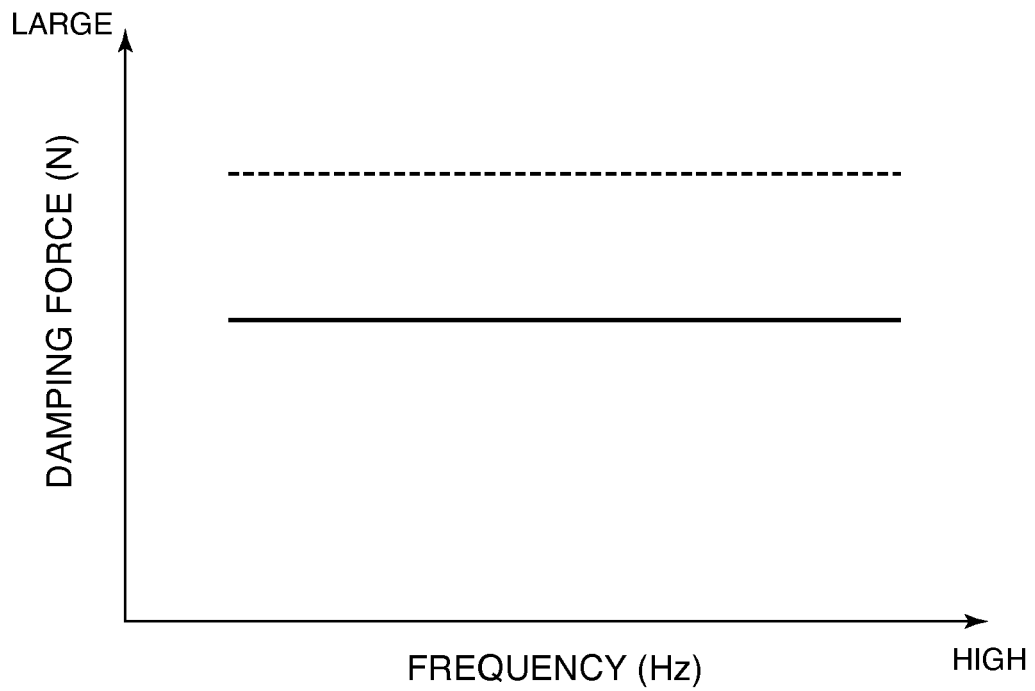
FIG. 4 is a diagram illustrating a relationship between the vibration frequency and the damping force generated by the damping device at a piston speed in a high-speed region.

Referring to FIG. 4, by providing the relief valve 12, the damping device D1 generates a smaller damping force, shown by a solid line in the figure, than the damping force generated by the damping device according to the prior art, shown by a dotted line in the figure, at all times, regardless of the input vibration frequency, in a high speed operating region of the piston 2.

Further, according to the damping device D1, an increase gradient of the damping force relative to an increase in the piston speed can be reduced. Hence, the damping force generated when the piston 2 moves at a high speed can be reliably reduced below that of the damping device according to the prior art.

According to the damping device D1, therefore, a defect occurring in the damping device according to the prior art, whereby the generated damping force remains high when the piston 2 operates at a high speed such that a function for blocking vibration transfer from the axle to the vehicle body is lost, can be solved reliably. As a result, the damping device D1 exhibits a favorable effect in terms of improving passenger comfort in the vehicle.

It should be noted that in the damping device D1, a value of the cutoff frequency Fa in FIG. 3 is preferably set at or above a sprung mass resonance frequency of the vehicle and at or below an unsprung mass resonance frequency of the vehicle, while the cutoff frequency Fb is preferably set at or below the unsprung mass resonance frequency of the vehicle.

With these settings, the damping device D1 generates a large damping force in relation to vibration input at the sprung mass resonance frequency. The large damping force stabilizes an attitude of the vehicle so that when the vehicle turns, the passenger does not feel anxious. Meanwhile, the damping device D1 generates a small damping force in relation to vibration input at the unsprung mass resonance frequency. The small damping force prevents high frequency vibration of the axle from being transferred to the vehicle body, leading to an improvement in the passenger comfort of the vehicle.

The damping force generated in the high speed operating region of the piston 2 may be suppressed by reducing the flow resistance of the damping force generating element 14 instead of providing the relief valve 12. When the flow resistance of the damping force generating element 14 is reduced, however, the damping force generated in response to vibration in the low frequency region at a low piston speed also decreases. As a result, the damping force may be insufficient, causing the passenger to feel anxious when the vehicle turns.

The damping force generated by the damping device D1 in the high speed operating region of the piston 2 can be reduced without reducing the flow resistance of the damping force generating element 14, and therefore the danger of insufficient damping force relative to vibration in the low frequency region does not arise.

In the damping device D1, the bypass passage 11 is independent of the passage constituted by the orifice 5a and the hollow portion R3 for increasing and reducing the damping force in accordance with the vibration frequency of the damping device D1, and therefore the bypass passage 11 may be formed in a site other than the projecting portion 15 of the piston 2. Hence, the bypass passage 11 may be disposed without causing increases in the structural complexity and size of the projecting portion 15. This is favorable in terms of avoiding increases in the size and manufacturing cost of the damping device.

In this embodiment, the speed of the piston 2 is divided into a low speed region and a high-speed region in order to describe the operation of the relief valve 12. A boundary between the two regions may be set as desired, but is preferably set at a piston speed where the relief valve 12 opens. In other words, the piston speed serving as the boundary between a low speed and a high speed is set at, or slightly higher than, a piston speed where the frequency dependence of the damping force disappears.

More specifically, the piston speed at which the frequency dependency of the damping force disappears is learned through experiments and so on, and an opening pressure of the relief valve 12 is set such that the relief valve 12 opens at a pressure generated in the connecting passage 6 when the piston 2 displaces relative to the cylinder 1 at the learned piston speed.

In this embodiment, the damping force generated when the damping device D1 expands at a high speed is reduced by providing the orifice 5a in the connecting passage 5 and providing the relief valve 12 in the bypass passage 11 that connects the connecting passage 6 to the lower chamber R2. Alternatively, the orifice 5a may be provided in the connecting passage 6 such that the bypass passage 11 connects the upper chamber R1 to the connecting passage 5 between the orifice 5a and the lower pressure chamber 8, and the relief valve 12 may be provided in the bypass passage 11 so as to open in accordance with the pressure in the lower pressure chamber 8. With this configuration, the damping force generated when the damping device D1 contracts at a high speed can be reduced.

By connecting the bypass passage 11 as described above and reversing an orientation of the relief valve 12 provided in the bypass passage 11, the damping force generated when the damping device expands at a high speed can be reduced.

Further, by providing a second bypass passage that connects the connecting passage 5 to the upper chamber R1 separately from the bypass passage 11 that connects the connecting passage 6 to the lower chamber R2 and providing a relief passage in the second bypass passage also, the damping force generated when the piston 2 operates at a high speed can be reduced during both the expansion stroke and the contraction stroke of the damping device D1. Instead of providing the second bypass passage, two oppositely oriented relief valves may be provided in parallel in the bypass passage 11.

In the embodiment described above, the hollow portion R3 is formed in the projecting portion 15 of the piston 2. However, the hollow portion R3 may be provided on the outer side of the cylinder 1, for example.

Figure 6:
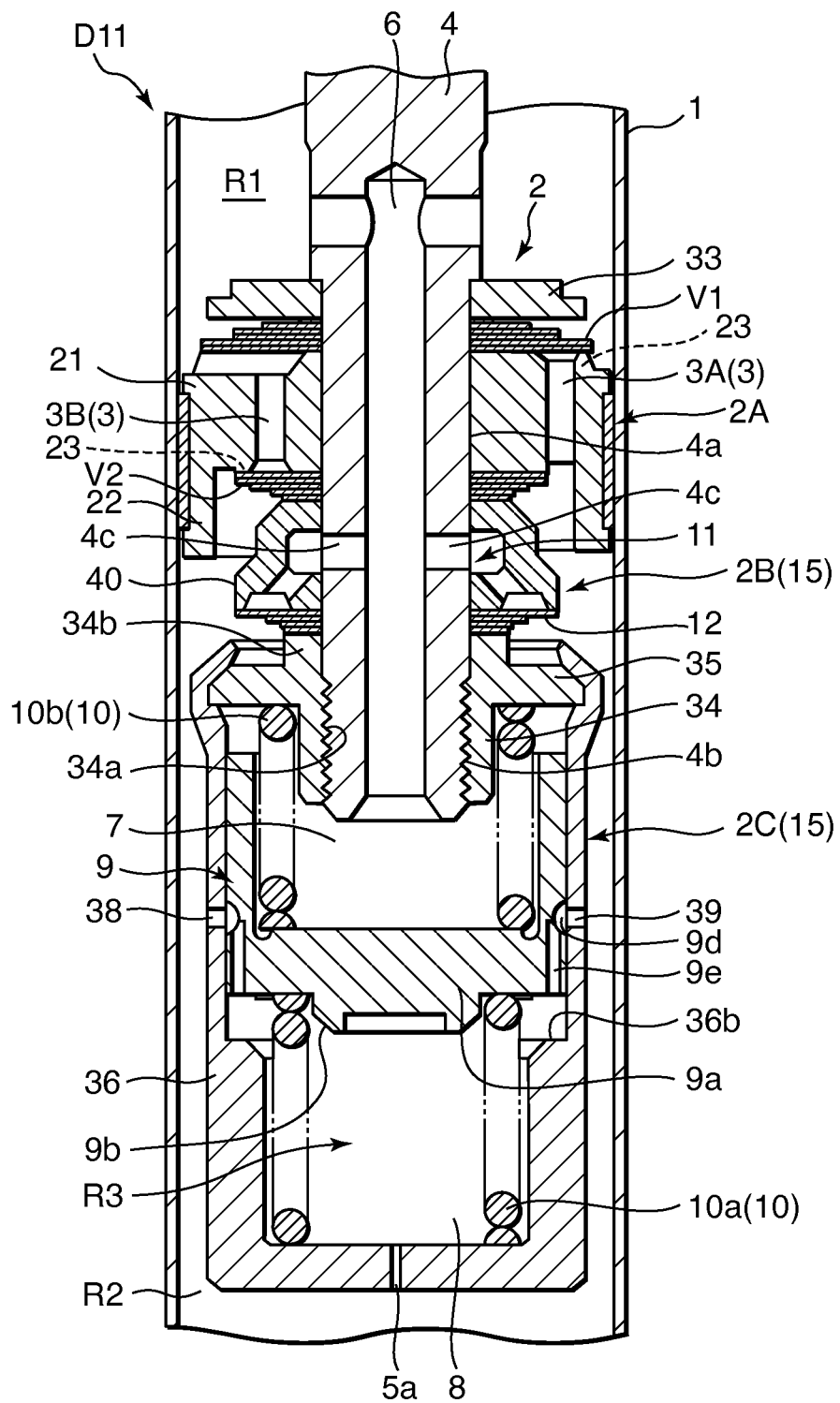
FIG. 6 is an enlarged longitudinal sectional view showing main parts of a detailed configuration of the damping device.

Referring to FIG. 6, a more specific configuration of the above damping device D1 will be described. The specific damping device shown in this figure will be referred to as a damping device D11 with respect to the damping device D1, the basic configuration of which is illustrated in FIG. 1. Members having identical reference symbols in FIGS. 1 and 6 are assumed to be identical, even when shaped differently.

In the damping device D11, the piston 2 is constituted by a piston main body 2A, a relief valve unit 2B, and a pressure chamber unit 2C. The relief valve unit 2B and the pressure chamber unit 2C together constitute the projecting portion 15 of FIG. 1. The piston 2 is fixed to the piston rod 4.

The piston rod 4 has a small diameter portion 4a on a lower end. A male screw 4b is formed on a tip end outer periphery of the small diameter portion 4a.

The connecting passage 6 is formed in the piston rod 4 in the axial direction so as to have opening portions respectively in a tip end of the small diameter portion 4a and an outer periphery of the piston rod 4 facing the upper chamber R1. The connecting passage 6 may also be provided with a throttle.

The piston main body 2A comprises a disc portion 21 and a skirt 22, and an outer periphery thereof is capable of sliding along an inner periphery of the cylinder 1. The small diameter portion 4a of the piston rod 4 penetrates a central portion of the piston main body 2A in the axial direction. The small diameter portion 4a also penetrates the relief valve unit 2B, and by screwing the male screw 4b on the tip end outer periphery thereof to the pressure chamber unit 2C, the piston 2 is fixed to the piston rod 4.

The passage 3 is formed in the piston main body 2A to penetrate the disc portion 21 longitudinally and thereby connect the upper chamber R1 and the lower chamber R2. The passage 3 is constituted by a plurality of passages 3A and 3B. An opening portion of the passage 3A into the upper chamber R1 is closed by a laminated leaf valve V1. An opening portion of the passage 3B into the lower chamber R2 is closed by a laminated leaf valve V2.

The laminated leaf valves V1 and V2 are both formed from laminated bodies of a plurality of circular leaves, a center of which is penetrated by the small diameter portion 4a of the piston rod 4. The laminated leaf valve V1 is sandwiched between the disc portion 21 and the piston rod 4 via a disc-shaped valve stopper 33. The laminated leaf valve V2 is sandwiched between the disc portion 21 and the relief valve unit 2B.

The skirt 22 of the piston main body 2A projects from the disc portion 21 toward the lower chamber R2 in parallel with a central axis of the piston rod 4. A bearing capable of sliding along an inner peripheral surface of the cylinder 1 is formed on the skirt 22. The laminated leaf valve V2 and a part of the relief valve unit 2B are sandwiched between the disc portion 21 and the piston rod 4 in a state where they are inserted into the inner side of the skirt 22 from below. By accommodating the laminated leaf valve V2 and a part of the relief valve unit 2B inside the skirt 22 in this manner, a distance between the pressure chamber unit 2C and the piston main body 2A can be shortened while securing a stroke length of the piston 2. The distance between the pressure chamber unit 2C and the piston main body 2A is preferably made short to secure a stroke distance of the damping device D11. Further, a length along which the cylinder 1 and the piston main body 2A contact each other is increased by the skirt 22, which is preferable for suppressing backlash of the piston 2 relative to the cylinder 1.

The laminated leaf valves V1 and V2 respectively close the passage 3 when seated on valve seats formed in the disc portion 21. In the damping device D1 shown in FIG. 1, the orifice 23 is constituted by a small cutout formed in the laminated leaf valves V1 and V2 or a very small recessed portion formed in the valve seats of the laminated leaf valves V1 and V2. These orifices allow a small amount of working oil to flow in accordance with the differential pressure between the upper chamber R1 and the lower chamber R2 even when the laminated leaf valves V1 and V2 are seated on the valve seats.

An amount of deformation of the laminated leaf valve V1 is limited by the valve stopper 33. An amount of deformation of the laminated leaf valve V2 is limited by a valve disc 40.

The laminated leaf valve V1 is opened by the differential pressure between the lower chamber R2 and the upper chamber R1 when the damping device D1 contracts such that the working oil flows from the lower chamber R2 into the upper chamber R1 through the passage 3A. The laminated leaf valve V2 is opened by the differential pressure between the upper chamber R1 and the lower chamber R2 when the damping device D11 expands such that the working oil flows from the upper chamber R1 into the lower chamber R2 through the passage 3B.

The laminated leaf valve V1 and the orifice formed in the valve seat of the laminated leaf valve V1 correspond to the damping force generating element 14 during a contraction operation of the damping device D11. Further, the laminated leaf valve V2 and the orifice formed in the valve seat of the laminated leaf valve V2 correspond to the damping force generating element 14 during an expansion operation of the damping device D11. The orifice has an inherent characteristic for rapidly increasing the flow resistance relative to an increase in the flow rate. Further, the laminated leaf valves V1 and V2 have a characteristic for increasing the flow resistance linearly relative to an increase in the flow rate due to the laminated structure of the leaves thereof. As a result, the damping force generating element 14 has a flow rate dependent damping characteristic according to which the damping force generated thereby increases together with an increase in the flow rate.

The relief valve unit 2B comprises the valve disc 40 and the relief valve 12. The bypass passage 11 is formed on an inner side the valve disc 40. A through hole 4c that opens onto the inner side of the valve disc 40 so as to connect the connecting passage 6 to the bypass passage 11 is formed in a radial direction in the small diameter portion 4a of the piston rod 4.

The relief valve 12 is provided in an opening portion of the bypass passage 11 facing the lower chamber R2. Here, the relief valve 12 is constituted by a laminated body of a plurality of leaves. It should be noted, however, that this invention is not dependent on the structure of the relief valve 12, and other types of valves may be used as the relief valve 12.

The relief valve 12 closes the bypass passage 11 when an outer peripheral portion thereof is seated on a valve seat formed on the valve disc 40. In an initial condition, an initial load can be applied to the relief valve 12 by causing the valve disc 40 to contact the relief valve 12 while deforming the outer periphery of the relief valve 12 downward in the figure. As a result of this initial load, an opening pressure of the relief valve 12 is set to be slightly higher than an opening pressure of the laminated leaf valve V2.

When the relief valve 12 is constituted by a plurality of laminated leaves, the initial load of the relief valve 12 may be set by sandwiching a ring between the leaves such that a leaf positioned on a lower side of the ring is deformed in advance by an amount corresponding to a thickness of the ring. A diameter of the ring is set to be smaller than the diameter of a leaf directly below the ring and larger than the diameter of a leaf below the aforesaid leaf.

The pressure chamber unit 2C comprises an inner tube 34 formed with a flange 35 and a closed-end tube-shaped outer tube 36.

A female screw 34a that is screwed to the male screw 4b formed on the small diameter portion 4a of the piston rod 4 is formed in an inner periphery of the inner tube 34. An upper end 34b of the inner tube 34 contacts a central portion of the relief valve 12 from a lower side of the figure so as to support the central portion of the relief valve 12 from below.

The valve stopper 33, the laminated leaf valve V1, the disc portion 21, the laminated leaf valve V2, the valve disc 40, and the relief valve 12 are stacked onto the outer periphery of the small diameter portion 4a of the piston rod 4 in that order, and fixed to the small diameter portion 4a of the piston rod 4 in this stacked condition by screwing the female screw 34a of the inner tube 34 to the male screw 4a of the small diameter portion 4. In other words, the pressure chamber unit 2C not only defines the hollow portion R3 but also serves as a piston nut that fixes the piston main body 2A and the relief valve unit 2B to the piston rod 4. It should be noted that by forming an outer periphery of the outer tube 36 with a sectional shape other than a perfect circle, for example a shape formed by cutting out a part of a perfect circle, a hexagonal shape, or the like, an operation for fastening the pressure chamber unit 2C to the small diameter portion 4a of the piston rod 4 can be performed easily. Further, by disposing the relief valve 12 on the pressure chamber unit 2C side of the valve disc 40 rather than the piston main body 2A side, it is easy to confirm that the relief valve 12 is set correctly when assembling the damping device D11.

The outer tube 36 is integrated with the inner tube 34 by fixing an upwardly oriented opening portion thereof to an outer periphery of the flange 36 by caulking, and as a result, the hollow portion R3 is formed on an inner side thereof. Integration of the inner tube 34 and the outer tube 36 is not limited to caulking and may be realized using a method such as welding instead. The flange 35 is formed in a position that does not interfere with deformation of the relief valve 12 when the relief valve 12 is lifted. A step portion 36b is formed on an inner periphery of the outer tube 36.

The free piston 9 has a closed-end tubular shape and is accommodated inside the outer tube 36 to be free to slide in the axial direction. The inside of the outer tube 36 is partitioned into the upper pressure chamber 7 and the lower pressure chamber 8 by the free piston 9. The free piston 9 is elastically supported in a neutral position by a coil spring 10*b* disposed in the upper pressure chamber 7 and a coil spring 10*a* disposed in the lower pressure chamber 8. The spring 10 shown in FIG. 1 is constituted by the coil springs 10*a* and 10*b* in the damping device D11. The coil springs 10*a* and 10*b* exert elastic force corresponding to an amount of displacement of the free piston 9 from the neutral position in the outer tube 36 on the free piston 9 in an opposite direction to the displacement. By elastically supporting the free piston 9 from both sides using the coil springs 10*a* and 10*b* in this manner, a pressing force oriented toward the neutral position is exerted on the free piston 9 at all times. This is favorable for ensuring that damping force is generated with stability in accordance with the input frequency.

A lower end of the coil spring 10*b* is disposed along an inner periphery of the free piston 9 so as to contact a bottom portion 9*a* of the free piston 9 on an inner side of the free piston 9. An upper end of the coil spring 10*a* is fitted to an outer periphery of a projection 9*b* provided to project in the axial direction from the bottom portion 9*a* of the free piston 9 while contacting the bottom portion 9*a* of the free piston 9 from an opposite direction to the coil spring 10*b*. This contact structure relating to the free piston 9 restricts positional deviation of the coil springs 10*a* and 10*b* in the radial direction relative to the free piston 9.

An opening portion in an upper end of the free piston 9 is formed to have a slightly larger diameter than an inner diameter of the bottom portion. The purpose of this is to prevent contamination of the working oil, which occurs when the coil spring 10*b* contracts, leading to an increase in a coil diameter thereof such that the coil spring 10*b* rubs against an inner wall surface of the free piston 9.

The spring 10 may be constituted by a plate spring or the like instead of the coil springs 10*a* and 10*b*. Alternatively, the spring 10 may be constituted by a single coil spring latched to the free piston 9 at one end and latched to the inner tube 34 or the outer tube 36 at another end.

The free piston 9 is prevented from displacing upward in the figure by causing a tip end opening portion thereof, or in other words an upper end in the figure, to contact the flange 35. Further, the free piston 9 is prevented from displacing downward in the figure by causing the bottom portion 9*a* to contact the step portion 36*b* of the outer tube 36.

An annular groove 9*d* and a through hole 9*e* that connects the annular groove 9*d* to the lower pressure chamber 8 are formed in the outer periphery of the free piston 9.

Orifices 38 and 39 that face the annular groove 9*d* in the neutral position of the free piston 9 are opened into side faces of the outer tube 36. When the free piston 9 is in the neutral position, the orifices 38 and 39 communicate with the lower chamber R2 and the lower pressure chamber 8 via the annular groove 9*d* and the through hole 9*e*. When the free piston 9 displaces upward or downward from the neutral position, an opening area of the orifices 38 and 39 decreases together with the displacement. At a stroke end where the free piston 9 contacts the flange 35 or the step portion 36*b*, the orifices 38 and 39 are completely closed. The orifices 38 and 39, the opening area of which varies in accordance with displacement of the free piston 9, serve to increase the damping force generated by the damping device D11 gradually as the free piston 9 approaches the stroke end before the laminated leaf valve V1 or V2 opens, thereby ensuring that the generated damping force does not increase rapidly in steps when the laminated leaf valve V1 or V2 opens after the free piston 9 reaches the stroke end. The orifices 38 and 39 are shown only in FIG. 6 and omitted from FIG. 1.

An orifice 5*a* that connects the lower chamber R2 to the lower pressure chamber 8 is formed in a bottom portion of the outer tube 36.

According to the damping device D11, the relief valve unit 2B comprising the bypass passage 11 and the relief valve 12 is formed independently of the pressure chamber unit 2C, and therefore the pressure chamber unit 2C can be constructed easily. Further, the piston main body 2A and the pressure chamber unit 2C can be used together with the aforesaid damping device according to the prior art, which does not comprise the bypass passage 11 and the relief valve 12.

Figure 7:
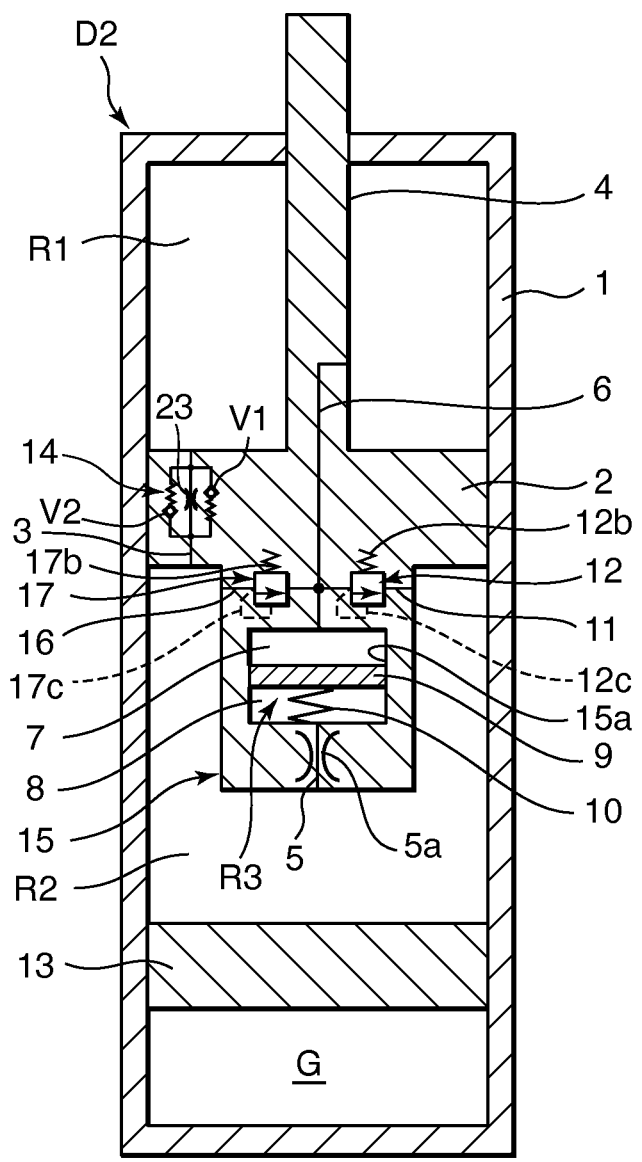
FIG. 7 is a schematic longitudinal sectional view of a damping device according to a second embodiment of this invention.

Referring to FIG. 7, a second embodiment of this invention will be described.

A damping device D2 according to this embodiment differs from the first embodiment shown in FIG. 1 in that two relief valves 12 and 17 are provided between the connecting passage 6 and the lower chamber R2 in accordance with a flow direction. Accordingly, the damping device D2 comprises a bypass passage 16 provided in parallel with the bypass passage 11 to connect the connecting passage 6 to the lower chamber R2, and the relief valve 17 is provided in the bypass passage 16. The bypass passage 11 and the relief valve 12 are configured similarly to those of the first embodiment, shown in FIG. 1.

The relief valve 17 opens the bypass passage 16 when the pressure in the lower chamber R2 exceeds the pressure in the connecting passage 6 such that the differential pressure therebetween reaches a relief pressure. As a result, the working oil in the lower chamber R2 flows into the upper chamber R1 through the connecting passage 6.

In the following description, the bypass passage 11 and the bypass passage 16 will be referred to as a first bypass passage and a second bypass passage, respectively, while the relief valve 12 and the relief valve 17 will be referred to as a first relief valve and a second relief valve, respectively.

All other configurations of the damping device D2 are identical to their counterparts in the damping device D1 of FIG. 1.

Figure 8:
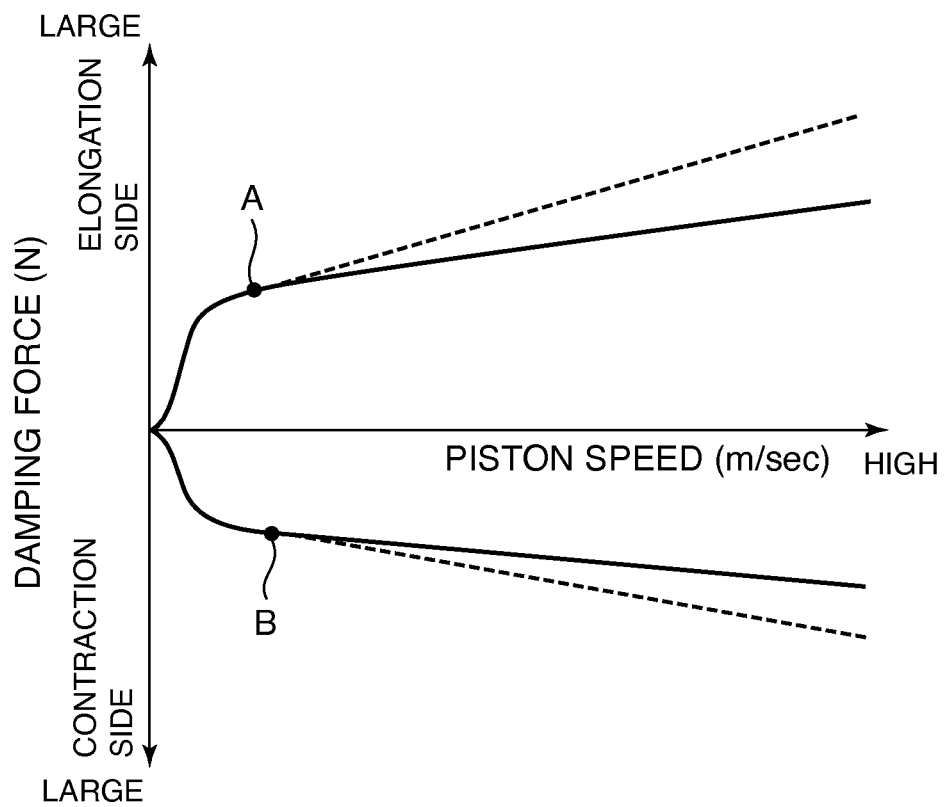
FIG. 8 is a diagram showing a damping characteristic of the damping device according to the second embodiment of this invention.

Referring to FIG. 8, according to the damping device D2, an increase in the generated damping force relative to an increase in the piston speed can be suppressed during both the expansion stroke and the contraction stroke, as shown by solid lines in the figure. Dotted lines in the figure correspond to a case in which the relief valves 12, 17 are not provided.

A point A in the figure corresponds to an opening timing of the first relief valve 12 during the expansion stroke of the damping device D2. A point B in the figure corresponds to an opening timing of the second relief valve 17 during the contraction stroke of the damping device D2.

The opening timing of the first relief valve 12 is set in accordance with the opening pressure of the first relief valve 12. The opening timing of the second relief valve 17 is set in accordance with an opening pressure of the second relief valve 17. A characteristic whereby the generated damping force increases relative to the piston speed of the damping device D2 after the first relief valve 12 has opened depends on the flow resistance of the first bypass passage 11. A characteristic whereby the generated damping force increases relative to the piston speed of the damping device D2 after the second relief valve 17 has opened depends on the flow resistance of the second bypass passage 16. These values may be set freely in accordance with the intentions of a designer.

According to this embodiment, the increase gradient of the generated damping force relative to the piston speed decreases during the contraction stroke of the damping device D2. Therefore, a superior effect is obtained in terms of reducing an impact shock when a vehicle wheel rides over a projection on the road surface. The increase gradient of the generated damping force relative to the piston speed also decreases during the expansion stroke, and therefore an impact generated by a reaction after dipping can be alleviated. According to the damping device D2, the damping force characteristic relative to the piston speed during both the expansion and contraction strokes can be set freely and independently. Therefore, the vehicle body can be supported reliably as the vehicle turns while reducing an impact shock received by the vehicle, and as a result, a pliant and robust vehicle suspension system can be realized.

Figure 9:
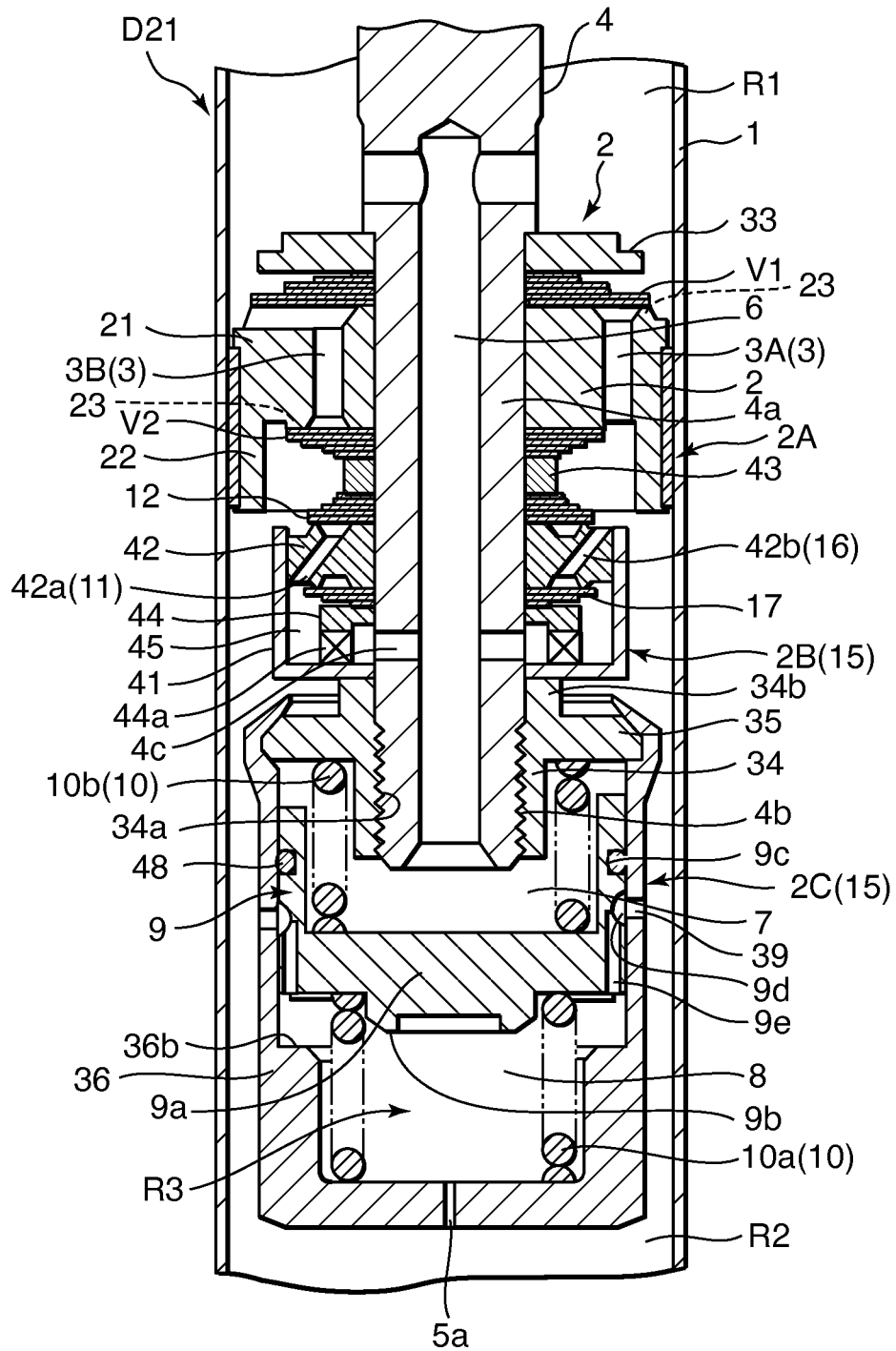
FIG. 9 is an enlarged longitudinal sectional view showing main parts of a detailed configuration of the damping device according to the second embodiment of this invention.

Referring to FIG. 9, a more specific configuration of the damping device D2 according to the second embodiment will be described. The specific damping device shown in this figure will be referred to as a damping device D21 with respect to the damping device D2, the basic configuration of which is illustrated in FIG. 7. Members having identical reference symbols in FIGS. 7 and 9 are assumed to be identical, even when shaped differently.

In the damping device D21, similarly to the damping device D11 of FIG. 6, the piston 2 is constituted by the piston main body 2A, the relief valve unit 2B, and the pressure chamber unit 2C.

The piston main body 2A is configured identically to that of the damping device D11 shown in FIG. 6, comprising the laminated leaf valves V1 and V2 serving as the damping force generating element.

In the damping device D21, the relief valve unit 2B comprises a spacer 43, the first relief valve 12, a valve disc 42, the second relief valve 17, a cutout spacer 44, and a valve case 41, into which the small diameter portion 4a of the piston rod 4 is inserted. The relief valve unit 2B is sandwiched between the piston main body 2A and the pressure chamber unit 2C when the spacer 43 contacts the laminated leaf valve V2 and the valve case 41 contacts the upper end 34b of the inner tube 34 of the pressure chamber unit 2C.

The valve disc 42 is a disc-shaped member that is fixed to an opening portion of the closed-end tube-shaped valve case 41 such that a tightly closed space 45 is formed on an inner side of the valve case 41. The second relief valve 17 and the cutout spacer 44 are accommodated inside the space 45. A sealing member such as an O-ring, a square ring, or ring-shaped packing is interposed between the valve disc 42 and the valve case 41 as required.

Inclined holes 42a and 42b communicating with the space 45 are formed in the valve disc 42 so as to penetrate the valve disc 42 in a diagonal direction. The inclined holes 42a and 42b are constituted by the inclined hole 42a, which moves gradually further away from the center of the piston rod 4 as it advances from an upper side to a lower side of the valve disc 42 in the figure, and the inclined hole 42b, which gradually approaches the center of the piston rod 4 as it advances from the upper side to the lower side of the valve disc 42 in the figure. An inlet of the inclined hole 42a is formed in a lower end of the valve disc 42, and an outlet is formed in an upper end of the valve disc 42. An inlet of the inclined hole 42b is formed in the upper end of the valve disc 42, and an outlet is formed in the lower end of the valve disc 42.

The outlet of the inclined hole 42a is provided on an inner side of an annular groove formed in the upper end of the valve disc 42. The inlet of the inclined hole 42b is positioned on an outer side of the annular groove formed in the upper end of the valve disc 42. The outlet of the inclined hole 42b is provided on an inner side of an annular groove formed in the lower end of the valve disc 42. The inlet of the inclined hole 42a is positioned on an outer side of the annular groove formed in the lower end of the valve disc 42.

The cutout spacer 44 is formed in the shape of an inverted closed-end tube such that a bottom surface thereof contacts the second relief valve 17 and an opening portion thereof contacts a bottom portion of the valve case 41. A cutout 44a that connects the space 45 to the through hole 4c is formed in the cutout spacer 44.

The first relief valve 12 is constituted by a plurality of laminated leaves. The spacer 43 is interposed between the laminated leaf valve V2 and the first relief valve 12. The spacer 43 limits respective amounts by which the first relief valve 12 and the laminated leaf valve V2 deform during opening displacement. The first relief valve 12 is disposed on an outer side of the valve case 41 such that when an outer periphery thereof is seated on the valve disc 42 from above in the figure, the annular groove in the upper end of the valve disc 42 is closed. As a result, the outlet of the inclined hole 42a is closed while the inlet of the inclined hole 42b opening onto the outer side of the annular groove remains open.

The second relief valve 17, similarly to the first relief valve 12, is constituted by a plurality of laminated leaves. The amount by which the second relief valve 17 deforms during opening displacement is limited by the bottom surface of the cutout spacer 44. The second relief valve 17 closes the annular groove in the lower end of the valve disc 42 when an outer periphery thereof is seated on the valve disc 42 from below in the figure. As a result, the outlet of the inclined hole 42b is closed while the inlet of the inclined hole 42a opening onto the outer side of the annular groove remains open.

The opening pressure of the relief valve 12 may be set as desired in accordance with an initial deformation of each leaf. The characteristic of the first relief valve 12 for increasing the generated damping force relative to the piston speed is basically dependent on the flow resistance of the first bypass passage 11, but is not limited to the flow resistance of the first bypass passage 11 and may also be set in accordance with the number of laminated leaves forming the first relief valve 12. This applies likewise to the second relief valve 17. Needless to mention, the respective opening pressures and damping force characteristics of the relief valves 12 and 17 may also be set independently of each other as desired.

The space 45 communicates with the connecting passage 6 at all times via the cutout 44a and the through hole 4c. In the configuration described above, the inclined hole 42a constitutes the first bypass passage 11 shown in FIG. 7 and the inclined hole 42b constitutes the second bypass passage 16 shown in FIG. 7.

The pressure chamber unit 2C has an identical basic configuration to the pressure chamber unit 2C of the damping device D11 shown in FIG. 6. The only difference is that in the damping device D21, an annular groove 9c is formed in the outer periphery of the free piston 9 and a friction member 48 is accommodated in the annular groove 9c.

The friction member 48 is provided to be capable of sliding along an inner peripheral surface of the outer tube 36 so as to apply resistance corresponding to the vibration frequency to displacement of the free piston 9 relative to the outer tube 36. More specifically, when the amplitude of the damping device D21 is large, or in other words in response to vibration in the low frequency region, which causes the free piston 9 to displace by a large amount, the friction member 48 slides along the inner peripheral surface of the outer tube 36 such that displacement of the free piston 9 relative to the outer tube 36 is suppressed by frictional force.

When the amplitude of the damping device D21 is small, or in other words in response to vibration in the high frequency region, which causes the free piston 9 to displace by a small amount, the friction member 48 deforms elastically such that displacement of the free piston 9 relative to the outer tube 36 is not suppressed. In this embodiment, the friction member 48 is attached to the free piston 9, but the friction member may be housed in an annular housing groove formed in the outer tube 36.

Figure 10:
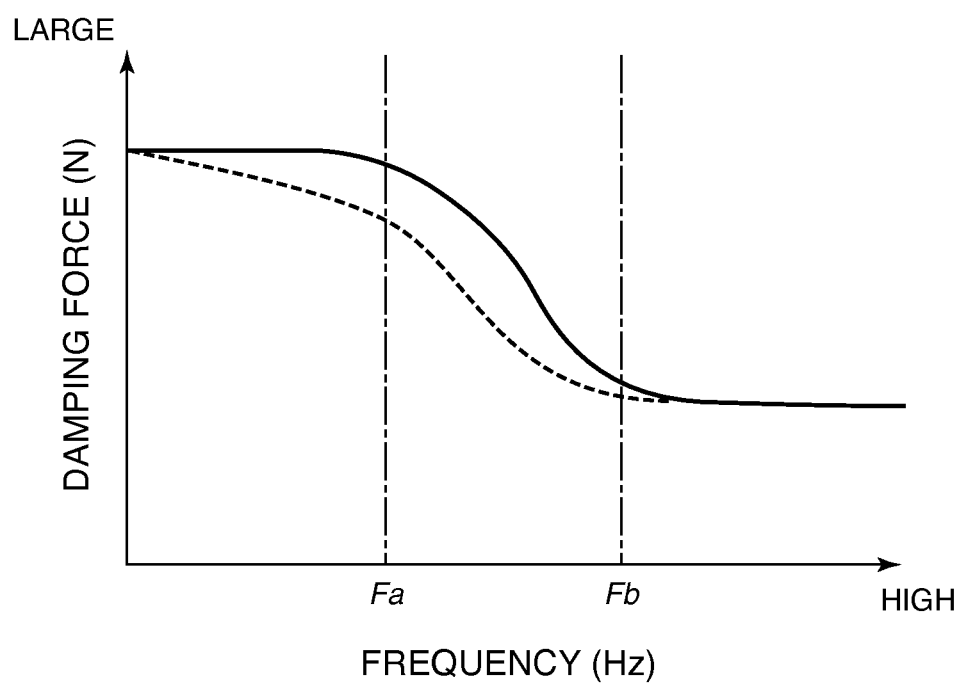
FIG. 10 is a diagram showing a characteristic of the generated damping force relative to the input vibration frequency in the damping device shown in FIG. 9.

Referring to FIG. 10, when the friction member 48 is not provided, the free piston 9 may displace excessively in response to vibration in the low frequency region, leading to a reduction in the damping force generated in response to vibration in the low frequency region in particular, as indicated by a dotted line in the figure. When the friction member 48 is provided, as shown by a solid line in the figure, the damping force generated in response to vibration in the low frequency region can be maintained at a large value. Hence, by employing the friction member 48, the damping force generated in response to vibration having a high input vibration frequency, such as vibration input when the vehicle travels over an uneven road surface, can be maintained at a small value, while the damping force generated in response to low frequency vibration input, such as centrifugal force applied as the vehicle turns, can be maintained at a large value.

Further, when the friction member 48 is constituted by a sealing member such as an O ring or a square ring, a sliding gap between the free piston 9 and the outer tube 36 is sealed, thereby preventing leakage of the working oil between the upper pressure chamber 7 and the lower pressure chamber 8. The friction member 48 is therefore preferably constituted by a sealing member to ensure that the damping device D21 exhibits the set damping force characteristic reliably.

The cutout 44a of the cutout spacer 44 may be formed by cutting out a part a part of a tubular portion of the closed-end tube-shaped cutout spacer 44 or formed as a hole penetrating the tubular portion. The shape of the valve case 41 is not limited to a cylindrical shape as long as the valve case 41 satisfies requirements of having a function for defining the space 45 and not impairing an operation of the second relief valve 17. The valve case 41 may be integrated with the valve disc 42 or integrated with the pressure chamber unit 2C. When the valve case 41 is integrated with the pressure chamber unit 2C, the outer tube 36 may be latched to the outer periphery of the valve disc 42, or the valve case 41 may be provided in either the inner tube 34 or the outer tube 36. By forming the valve case 41 in this manner, the need to fix the valve case 41 directly to the small diameter portion 4a of the piston rod 4 is eliminated. Further, by forming the valve case 41 in this manner, the working oil in the space 45 can be prevented from leaking into the lower chamber R2 either through a gap between the valve case 41 and the valve disc 40 or through a gap between the valve case 41 and the inner tube 34.

Figure 11:
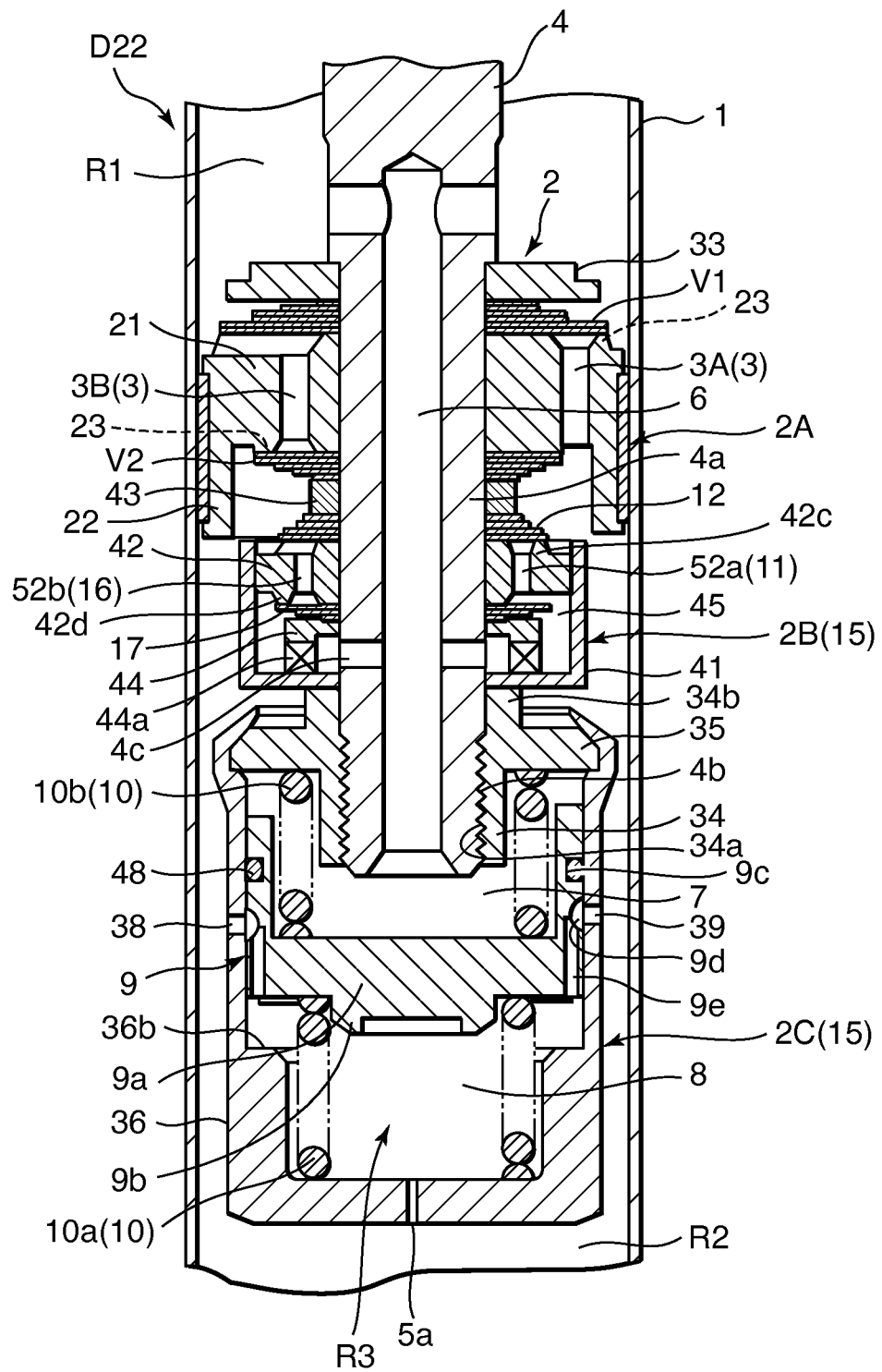
FIG. 11 is similar to FIG. 9, but shows a variation relating to a configuration of a relief valve unit.

Referring to FIG. 11, a variation relating to the configuration of the relief valve unit 2B according to the second embodiment will be described.

In a damping device D22 shown in FIG. 11, the first bypass passage 11 is constituted by a straight hole 52a that penetrates the valve disc 42 in a central axis direction of the piston rod 4, while the second bypass passage 16 is constituted by a straight hole 52b that penetrates the valve disc 42 in the central axis direction of the piston rod 4.

An inlet of the straight hole 52a and an outlet of the straight hole 52b are positioned on an identical circumference. An outlet of the straight hole 52a and an inlet of the straight hole 52b are also positioned on an identical circumference.

Hence, to seat the first relief valve 12, a valve seat 42c formed on an upper end of the valve disc 42 is formed in a planar petal shape that covers the outlet of the straight hole 52a while avoiding the inlet of the straight hole 52b. Similarly, to seat the second relief valve 17, a valve seat 42d formed on a lower end of the valve disc 42 is formed in a planar petal shape that covers the outlet of the straight hole 52b while avoiding the inlet of the straight hole 52a.

All other configurations of the damping device D22 are identical to their counterparts in the damping device D21 shown in FIG. 9.

By forming the bypass passages 11 and 16 from the straight holes 52a and 52b in this manner, a hole drilling operation can be performed on the valve disc 42 easily.

Figure 12:
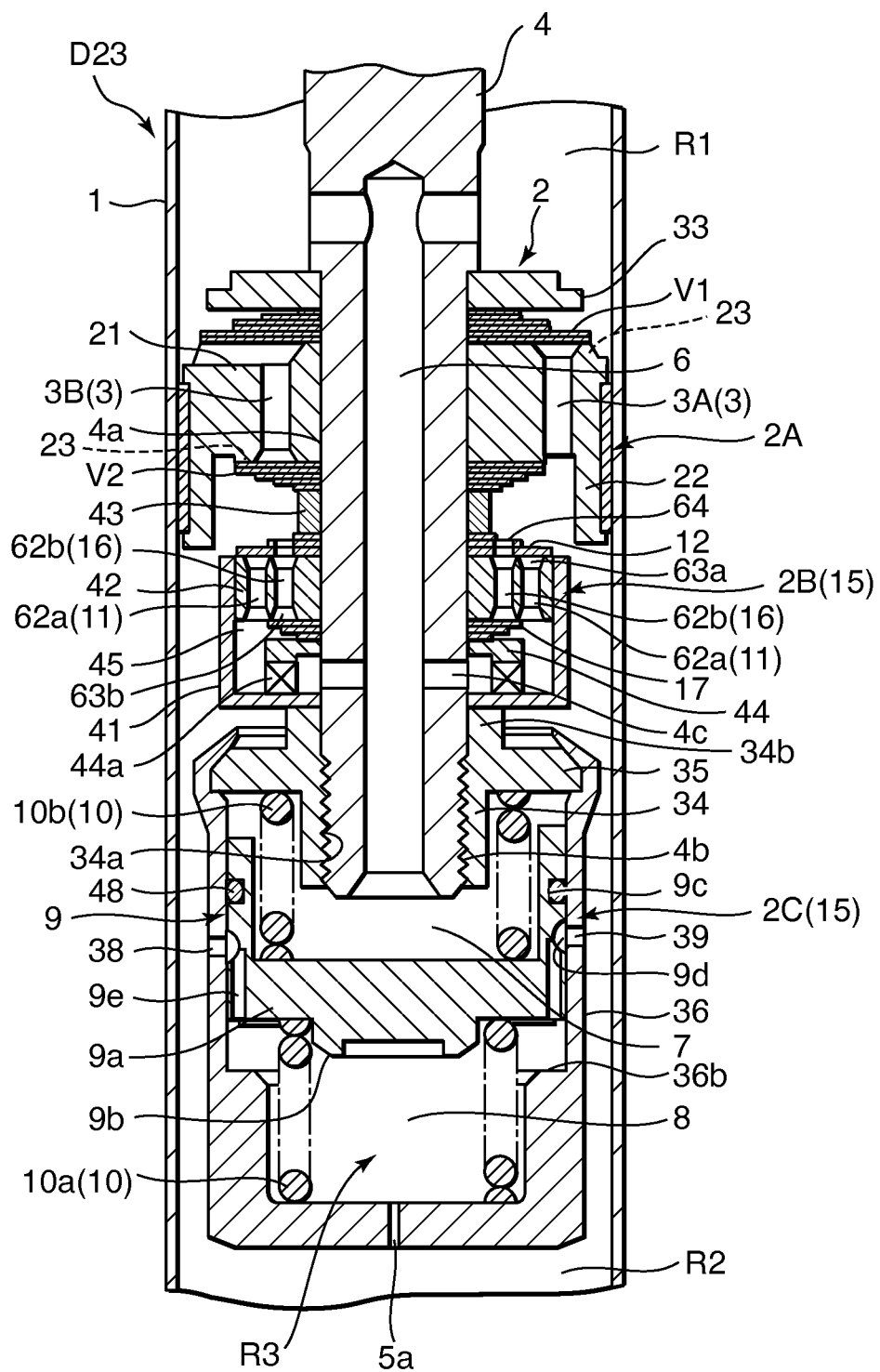
FIG. 12 is similar to FIG. 9, but shows another variation relating to the configuration of the relief valve unit.
Figure 13:
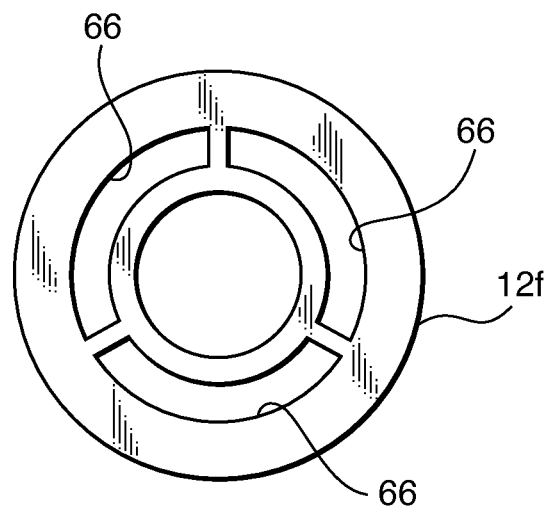
FIG. 13 is a plan view of a leaf of a relief valve of the damping device shown in FIG. 12.
Figure 14:
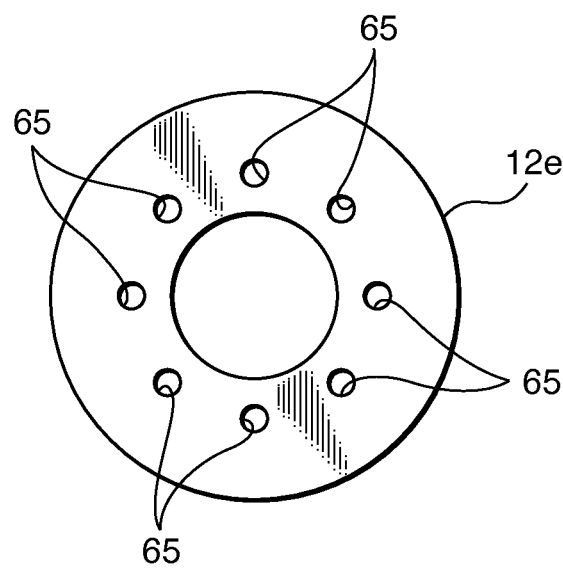
FIG. 14 is a plan view of another leaf of the relief valve of the damping device shown in FIG. 12.

Referring to FIGS. 12 to 14, another variation relating to the configuration of the relief valve unit 2B according to the second embodiment will be described.

In a damping device D23 shown in FIG. 12, the first bypass passage 11 is constituted by a straight hole 62a that penetrates the valve disc 42 in the central axis direction of the piston rod 4, while the second bypass passage 16 is constituted by a straight hole 62b that penetrates the valve disc 42 in the central axis direction of the piston rod 4. The straight hole 62a is formed in a plurality on a circumference centering on the central axis of the piston rod 4. The straight hole 62b is formed in a plurality on a circumference that likewise centers on the central axis of the piston rod 4 but has a smaller diameter than the circle in which the straight holes 62a are formed.

The straight holes 62a open onto an annular groove 63a formed in the upper end of the valve disc 42. The straight holes 62b open onto an annular groove 63b formed in the lower end of the valve disc 42. A plurality of hole portions 64 facing the inlets of the straight holes 62b are formed in the first relief valve 12. The first relief valve 12 closes the annular groove 63a when seated on the upper end of the valve disc 42.

When the first relief valve 12 is constituted by a laminated body of a plurality of leaves, the hole portions 64 must be formed in all of the leaves covering the inlets of the straight holes 62b.

Referring to FIG. 14, a plurality of through holes 65 are formed in a leaf 12e that is furthest from the valve disc 42 in the central axis direction of the piston rod 4, from among the plurality of leaves constituting the first relief valve 12.

Referring to FIG. 13, a plurality of arch-shaped through holes 66 are formed in another leaf 12f. The through holes 65 and 66 are formed on an identical circumference. The hole portions 64 penetrating the first relief valve 12 are formed by overlapping the through holes 65 and the through holes 66.

All other configurations of the damping device D23 are identical to their counterparts in the damping device D21 shown in FIG. 9.

By forming the hole portions 64 as shown in FIGS. 13 and 14, overlap between the through holes 65 and 66 can be confirmed when the leaves 12e and 12f are laminated without performing positioning with respect to a circumferential direction. Hence, a flow surface area of the hole portions 64 does not vary depending on the relative circumferential direction positions of the leaves 12e and 12f, and therefore an operation to assemble the first relief valve 12 can be performed easily.

The annular groove 63b formed in the lower end of the valve disc 42, meanwhile, is closed by seating the second relief valve 17 on the lower end of the valve disc 42. The inlets of the straight holes 62a are positioned on an outer side of the second relief valve 17, and therefore remain in an open condition at all times, regardless of whether the second relief valve 17 is open or closed.

It should be noted that when the straight holes 62b are disposed on an outer side of the straight holes 62a, the hole portions 64 are formed in the second relief valve 17 such that the inlets of the straight holes 62a communicate with the space 45 at all times via the hole portions 64.

Figure 15:
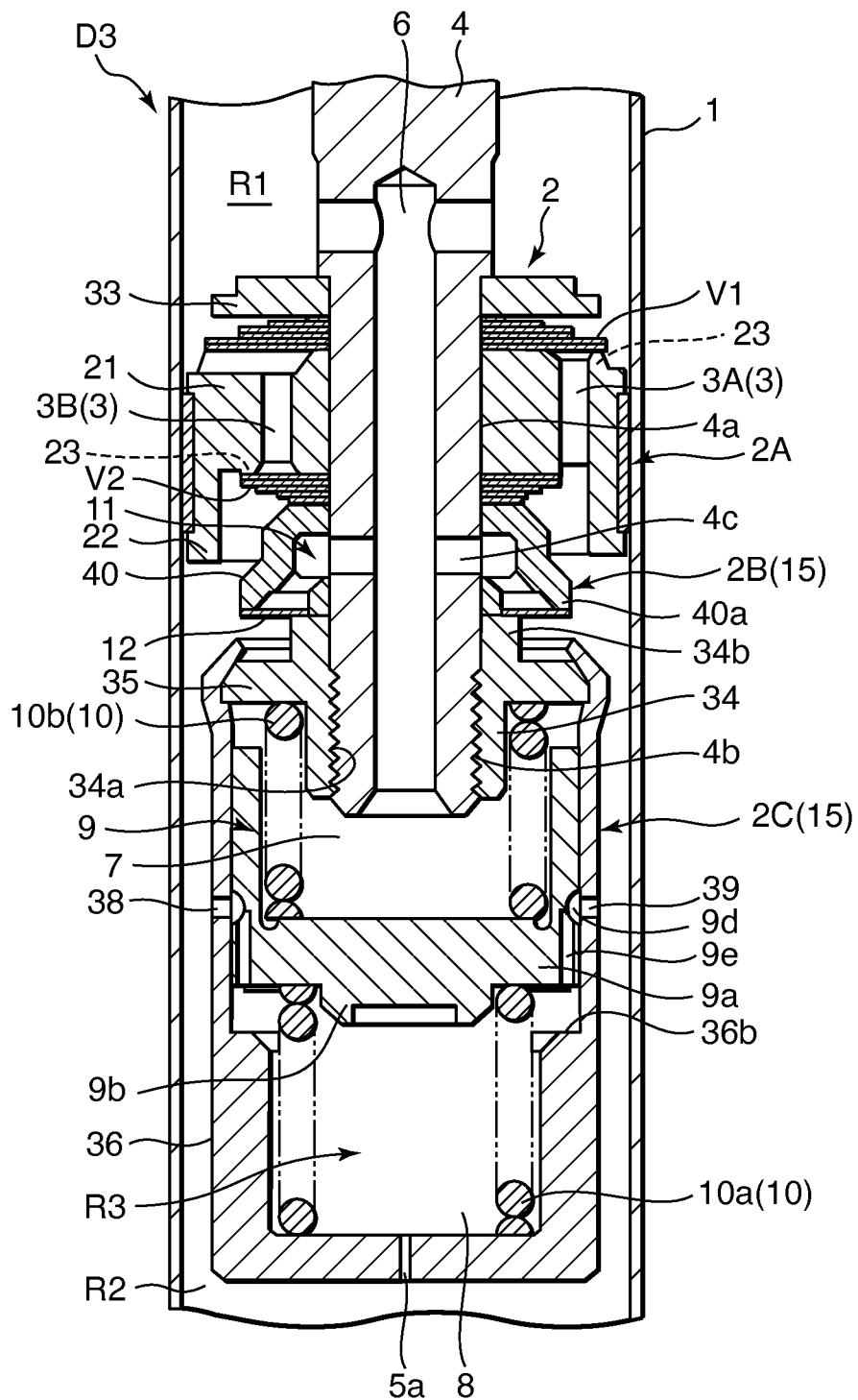
FIG. 15 is an enlarged longitudinal sectional view showing main parts of a damping device according to a third embodiment of this invention.

Referring to FIG. 15, a third embodiment of this invention will be described.

A damping device D3 shown in the figure varies the characteristic of the generated damping force relative to the piston speed during both the expansion stroke and the contraction stroke of the piston 2 using the single relief valve 12. Accordingly, the relief valve 12 used in the damping device D3 is configured differently to that of the damping device D11 shown in FIG. 6.

More specifically, in the damping device D3, the relief valve 12 is constituted by a single flattened ring-shaped leaf, a center of which is penetrated by the small diameter portion 4a of the piston rod 4. The relief valve 12 may be constituted by laminated leaves. An outer periphery of the relief valve 12 is seated on an annular valve seat 40a provided on the valve disc 40, and an inner periphery of the relief valve 12 is seated on the upper end 34b, in the figure, of the inner tube 34. The bypass passage 11 is formed in the valve disc 42, and the relief valve 12 opens and closes an opening portion of the bypass passage 11 that faces the lower chamber R2.

When the pressure in the upper chamber R1, which is led into the connecting passage 6, exceeds the pressure in the lower chamber R2 such that the differential pressure therebetween reaches or exceeds a first relief pressure, the outer periphery of the relief valve 12 is deformed downward in the figure while the inner periphery remains supported on the upper end 34b of the inner tube 34, and as a result, the outer periphery is lifted from the valve seat 40a so as to open the bypass passage 11, whereby the working oil in the upper chamber R1 flows into the lower chamber R2 through the connecting passage 6.

When the pressure in the lower chamber R2 exceeds the pressure in the upper chamber R1 led into the connecting passage 6 such that the differential pressure therebetween reaches or exceeds a second relief pressure, the inner periphery of the relief valve 12 is deformed upward in the figure while the outer periphery remains supported on the valve seat 40a of the valve disc 40, and as a result, the inner periphery is lifted from the upper end 34b of the inner tube 34 so as to open the bypass passage 11, whereby the working oil in the lower chamber R2 flows into the upper chamber R1 through the connecting passage 6.

In other words, the valve seat 40a functions as a valve seat of the relief valve 12 with respect to a flow from the first working chamber R1 into the second working chamber R2, and as a support member of the relief valve 12 with respect to a flow in an opposite direction. The upper end 34b of the inner tube 34, meanwhile, functions as a valve seat of the relief valve with respect to a flow from the second working chamber R2 into the first working chamber R1, and as a support member of the relief valve 12 with respect to a flow in an opposite direction. Hence, the inner periphery and the outer periphery of the relief valve 12 are respectively supported from opposite directions by different support members.

With the structure described above, the relief valve 12 exhibits a relief function with respect to a bidirectional flow through the bypass passage 11. All other configurations of the damping device D3 are identical to their counterparts in the damping device D11 shown in FIG. 6.

When the piston speed is high during the expansion stroke of the damping device D3, the bypass passage 11 is opened by the pressure in the upper chamber R1, which is led into the connecting passage 6, thereby preventing the damping force generated during expansion of the damping device D3 from becoming excessive. Further, when the piston speed is high during the contraction stroke of the damping device D3, the bypass passage 11 is opened by the pressure in the lower chamber R2, thereby preventing the damping force generated during contraction of the damping device D3 from becoming excessive. Hence, when the piston speed is high, an increase in the generated damping force can be suppressed regardless of the stroke direction of the piston 2. In the damping device D3, an increase in the generated damping force relative to the piston speed can be suppressed during both the expansion stroke and the contraction stroke using the single bypass passage 11 and the single relief valve 12 rather than by providing the two bypass passages 11 and 16 and the two relief valves 12 and 17, as in the second embodiment.

Figure 16:
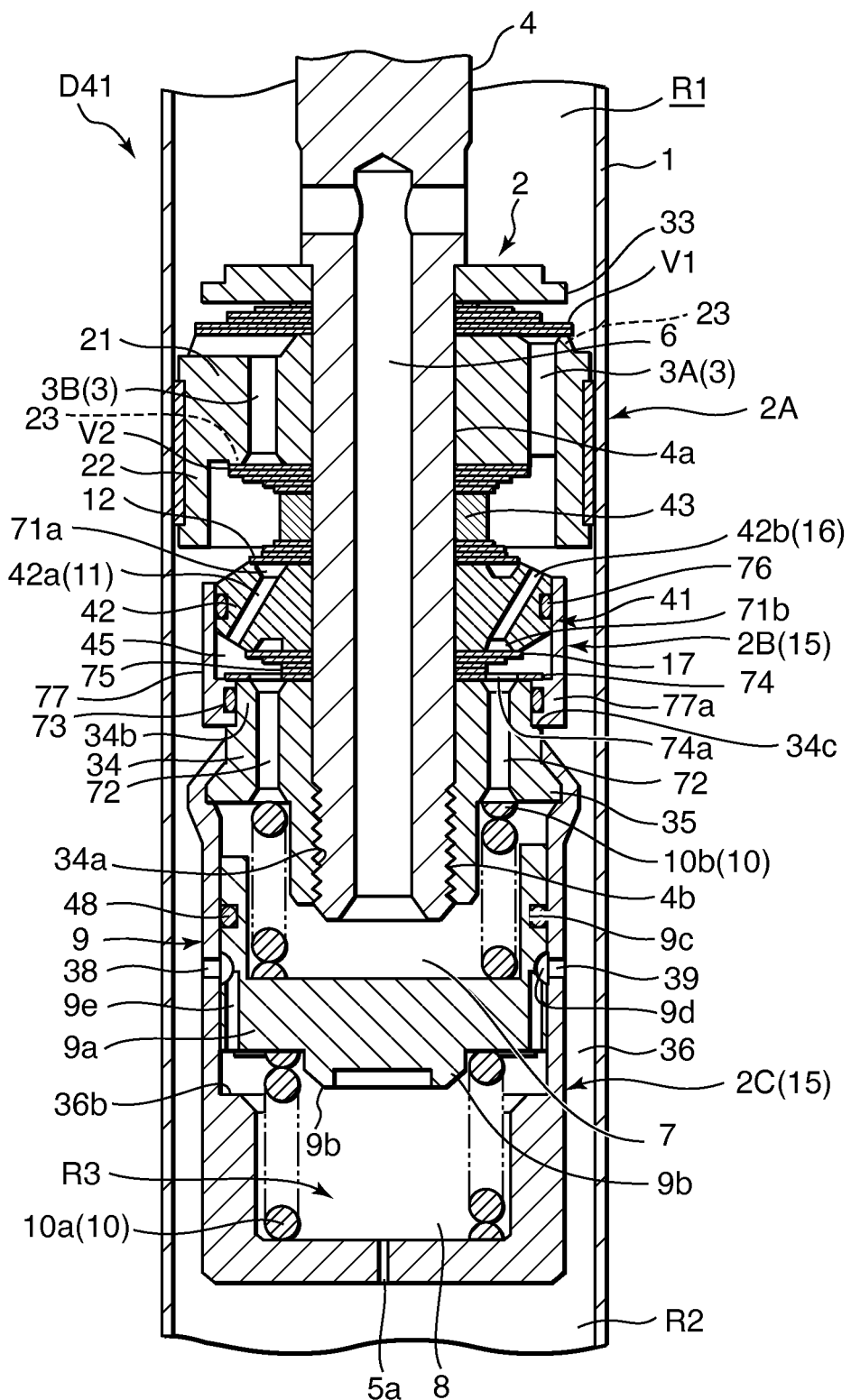
FIG. 16 is an enlarged longitudinal sectional view showing main parts of a damping device according to a fourth embodiment of this invention.
Figure 17:
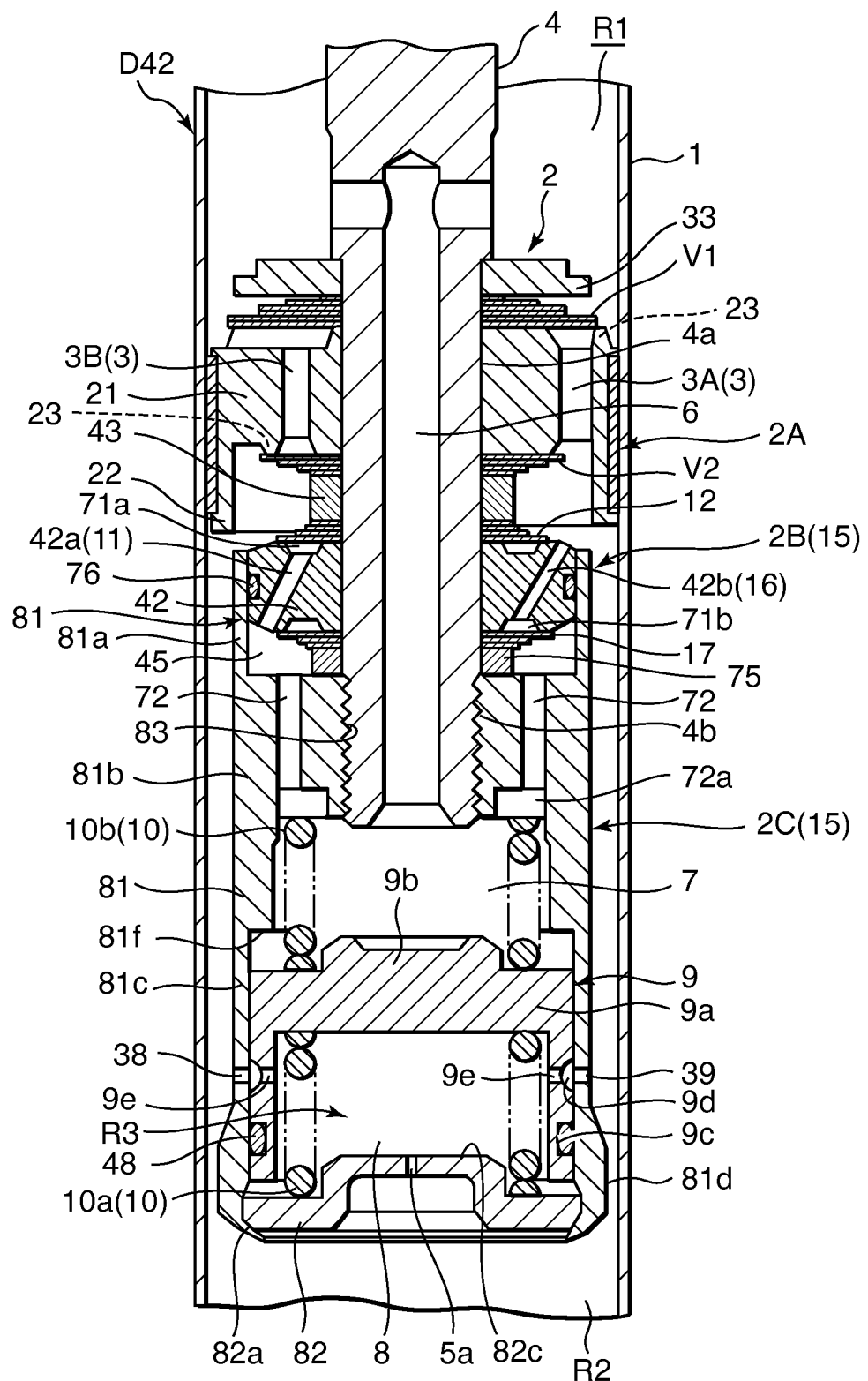
FIG. 17 is similar to FIG. 16, but shows a variation relating to configurations of a relief valve unit and a pressure chamber unit.

Referring to FIGS. 16 and 17, a fourth embodiment of this invention will be described.

Damping devices D41 and D42 according to this embodiment differ from the second embodiment in that the bypass passages 11 and 16 connect the upper chamber R1 to the lower chamber R2 via the upper pressure chamber 7.

In the damping device D41 shown in FIG. 16, the valve case 41 of the relief valve unit 2B comprises a tubular body 77 fitted respectively to the outer periphery of the valve disc 42 and an outer periphery of the upper end 34b of the inner tube 34 in the pressure chamber unit 2C. A seal ring 76 is interposed between the tubular body 77 and the outer periphery of the valve disc 42. The seal ring 76 prevents leakage of the working oil between the space 45 and the lower chamber R2 and absorbs radial direction backlash between the tubular body 77 and the valve disc 42.

The plurality of inclined holes 42a and 42b are formed in the valve disc 42, similarly to the damping device D21 shown in FIG. 9. The inclined hole 42a corresponds to the first bypass passage 11, and the inclined hole 42b corresponds to the second bypass passage 16.

An annular groove 71a that communicates with the outlet of the inclined hole 42a is formed in the upper end of the valve disc 42. The first relief valve 12 is constituted by a laminated body of a plurality of leaves, and closes the annular groove 71a. The inlet of the inclined hole 42b opens onto the upper end of the valve disc 42 on the outer side of the first relief valve 12 in the radial direction.

An annular groove 71b that communicates with the outlet of the inclined hole 42b is formed in the lower end of the valve disc 42. The second relief valve 17 is constituted by a laminated body of a plurality of leaves, and closes the annular groove 71b. The inlet of the inclined hole 42a opens onto the lower end of the valve disc 42 on the outer side of the second relief valve 17 in the radial direction.

A plurality of through holes 72 communicating with the space 45 in the valve case 41 are formed in the inner tube 34 on a circumference centering on the central axis of the piston rod 4. Accordingly, the inner tube 34 is formed with a larger diameter than that of the damping device D11 shown in FIG. 6. A fitting portion of the upper end 34b of the inner tube 34 that is fitted to the tubular body 77 is formed with a slightly smaller diameter via a step 34c. A fitting portion 77a of the tubular body 77 that is fitted to the upper end 34b of the inner tube 34, on the other hand, is formed to be slightly thicker. A seal ring 73 is sandwiched between these fitting portions. The seal ring 73 prevents leakage of the working oil between the space 45 and the lower chamber R2 and absorbs radial direction backlash between the tubular body 77 and the inner tube 34.

In the damping device D41, in contrast to the damping device D21 shown in FIG. 9, the second relief valve 17 is directly supported on the upper end 34b of the inner tube 34 via a plate 74 and a spacer 75.

The spacer 75 is fitted to the outer periphery of the small diameter portion 4a of the piston rod 4, and serves to secure a space in which the leaves of the second relief valve 17 can deform.

The plate 74 is constituted by a circular plate that has a larger diameter than an end surface of the upper end 34b of the inner tube 34 and is fitted to the outer periphery of the small diameter portion 4a of the piston rod 4. The plate 74 sandwiches the fitting portion 77a of the tubular body 77 together with the step 34c, and serves to prevent the fitting portion 77a from falling off the upper end 34b of the inner tube 34. A hole portion 74a is formed in a position corresponding to the through holes 72 in the plate 74 to ensure that a working oil flow between the through holes 72 and the space 45 is not obstructed.

In the damping device D41, the upper chamber R1 communicates with the space 45 in the valve case 41 at all times via the connecting passage 6, the upper pressure chamber 7, and the through holes 72.

The working oil in the space 45 is capable of flowing into the lower chamber R2 via the inclined hole 42a and the first relief valve 12, and the working oil in the lower chamber R2 is capable of flowing into the space 45 via the inclined hole 42b and the second relief valve 17.

Likewise in the damping device D41, when the piston speed is high, the first relief valve 12 is opened to allow the working oil to flow from the upper chamber R1 into the lower chamber R2 during the expansion stroke, and the second relief valve 17 is opened to allow the working oil to flow from the lower chamber R2 into the upper chamber R1 during the contraction stroke. Hence, with the damping device D41, similarly to the second and third embodiments, an increase rate of the generated damping force relative to an increase in the piston speed can be suppressed during both the expansion stroke and the contraction stroke.

The damping device D41 uses the spacer 75 to secure the space for the second relief valve 17 to deform instead of the cutout spacer 44 of the second embodiment. As a result, a distance between the valve disc 42 and the inner tube 34 can be shortened, enabling an increase in a possible stroke distance relative to an entire length of the damping device D41.

Referring to FIG. 17, a variation of the fourth embodiment will be described.

The damping device D42 shown in the figure differs from the damping device D41 of FIG. 16 as follows. In the damping device D42, the pressure chamber unit 2C is constituted by a cylindrical housing 81 and a cap 82 that closes a lower end opening portion of the housing 81 instead of the outer tube 36 and the inner tube 34. Further, the valve case 41 of the relief valve unit 2B is omitted, and the valve disc 42 and second relief valve 17 of the relief valve unit 2B are accommodated in the housing 81.

The housing 81 is constituted by an upper portion 81a serving as a first extension portion, a partition wall portion 81b, and a lower portion 81c serving as a second extension portion.

The upper portion 81a has a cylindrical shape and extends from the partition wall portion 81b toward the relief valve unit 2B. A tip end of the upper portion 81a is attached to the outer periphery of the valve disc 42. The second relief valve 17 and the spacer 75 are accommodated in the space 45, which is defined by the upper portion 81a and the valve disc 42. The plate 74 used in the damping device D41 of FIG. 16 is omitted here, and the second relief valve 17 is supported by the partition wall portion 81b via the spacer 75.

The partition wall portion 81b functions to partition the upper portion 81a from the lower portion 81c. A screw hole 83 that is screwed to the male screw 4b on the tip end of the small diameter portion 4a of the piston rod 4 is formed in a center of the partition wall portion 81b.

The lower portion 81c has a cylindrical shape and extends from the partition wall portion 81b in an opposite direction to the relief valve unit 2B in the central axis direction of the piston rod 4.

The cap 82 is fixed to a lower end of the lower portion 81c by caulking. A chamfer 82a for promoting plastic deformation of the lower end of the lower portion 81c is formed in advance on an outer periphery of the cap 82 by caulking. The cap 82 comprises a projecting portion 82c that projects into the lower pressure chamber 8. The orifice 5a is formed in the projecting portion 82c. The projecting portion 82c makes it easy to differentiate between a front and a back of the cap 82 when assembling the damping device D42. The projecting portion 82c is also useful for positioning the coil spring 10a in the radial direction. The projecting portion 82c may be omitted.

A grip portion 81d that can be gripped by a fastening tool is formed on an outer periphery of the lower end of the lower portion 81c forming the housing 81. An outer shape of the grip portion 81d is set in advance in accordance with a shape of the fastening tool, and a shape other than a perfect circle, such as a shape obtained by cutting a circle along parallel lines or a hexagonal shape, for example, may be applied. An axial direction length of the grip portion 81d is set such that the fastening tool can access and engage with the grip portion 81d from an outer side of the housing 81.

The housing 81 is attached to the piston rod 4 by fastening the screw hole 83 in the housing 81 to the male screw 4b formed on the small diameter portion 4a of the piston rod 4 via the grip portion 81d gripped by the fastening tool. Before fixing the housing 81 to the piston rod 4, the cap 82 is fixed to the lower end of the lower portion 81c of the housing 81 by caulking. When the screw hole 83 is fastened to the male screw 4b, the cap 82 rotates integrally with the housing 81, and therefore fastening torque does not act on the cap 82. This fixing structure for fixing the housing 81 to the piston rod 4 is favorable in terms of preventing backlash between the cap 82 and the housing 81.

The hollow portion R3 accommodating the free piston 9 is formed on an inner side of the lower portion 81c. A step portion 81f is formed in the hollow portion R3 to increase a diameter of a lower portion of the hollow portion R3. By increasing an inner diameter of the hollow portion R3 in downward steps from the partition wall portion 81b having the smallest inner diameter, the housing 81 can be manufactured easily. Accordingly, the free piston 9 is accommodated in the hollow portion R3 with the bottom portion 9a thereof oriented upward. The free piston 9 is prevented from displacing upward by the upwardly oriented bottom portion 9a, which contacts the step portion 81f, and prevented from displacing downward by a downwardly oriented tip end portion thereof, which contacts the cap 82.

The hollow portion R3 is divided into the upper pressure chamber 7 and the lower pressure chamber 8 by the free piston 9. The free piston 9 is supported elastically in the neutral position within the hollow portion R3 by the coil spring 10b accommodated in the upper pressure chamber 7 and the coil spring 10a accommodated in the lower pressure chamber 8.

The through hole 72 is formed in the partition wall portion 81b to connect the space 45 formed on the inner side of the upper portion 81a to the upper pressure chamber 7 formed in the lower portion 81c. The through hole 72 penetrates the partition wall portion 81b in the central axis direction of the piston rod 4. A plurality of arch-shaped cutouts 72a formed at intervals in the circumferential direction are provided in an opening portion of the through hole 72 opening into the upper pressure chamber 7 to ensure that the opening portion of the through hole 72 opening into the upper pressure chamber 7 is not closed by the coil spring 10b.

An annular groove 9d and a through hole 9e that connects the annular groove 9d to the lower pressure chamber 8 are formed in the outer periphery of the free piston 9. The orifices 38 and 39 are formed in the housing 81 to face the annular groove 9d in the neutral position of the free piston 9.

The annular groove 9c is formed in the free piston 9 similarly to the damping device D41 shown in FIG. 16, and the friction member 48 is accommodated in the annular groove 9c. An axial direction position of the annular groove 9c is set between the annular groove 9d and the downwardly oriented tip end portion of the free piston 9. The free piston 9 is inserted into the housing 81 in a condition where the friction member 48 is attached to the annular groove 9c. The annular groove 9c is formed further toward the lower side of the figure than the annular groove 9d, and therefore the friction member 48 does not interfere with the orifices 38 and 39 when the free piston 9 is inserted into the housing 81. Setting the position of the annular groove 9c in this manner is therefore favorable in terms of preventing damage to the friction member 48.

All other configurations of the damping device D42 are identical to their counterparts in the damping device D41 shown in FIG. 16.

According to the damping device D42, in comparison with the damping device D41 shown in FIG. 16, the valve case 41 of the relief valve unit 2B and the inner tube 34 of the pressure chamber unit 2C are not required.

The straight holes 52a and 52b of the damping device D22 shown in FIG. 11 or the straight holes 62a and 62b of the damping device D23 shown in FIG. 12 may be formed in the valve disc 42 of the damping devices D41 and D42 instead of the inclined holes 42a and 42b.

Figure 18:
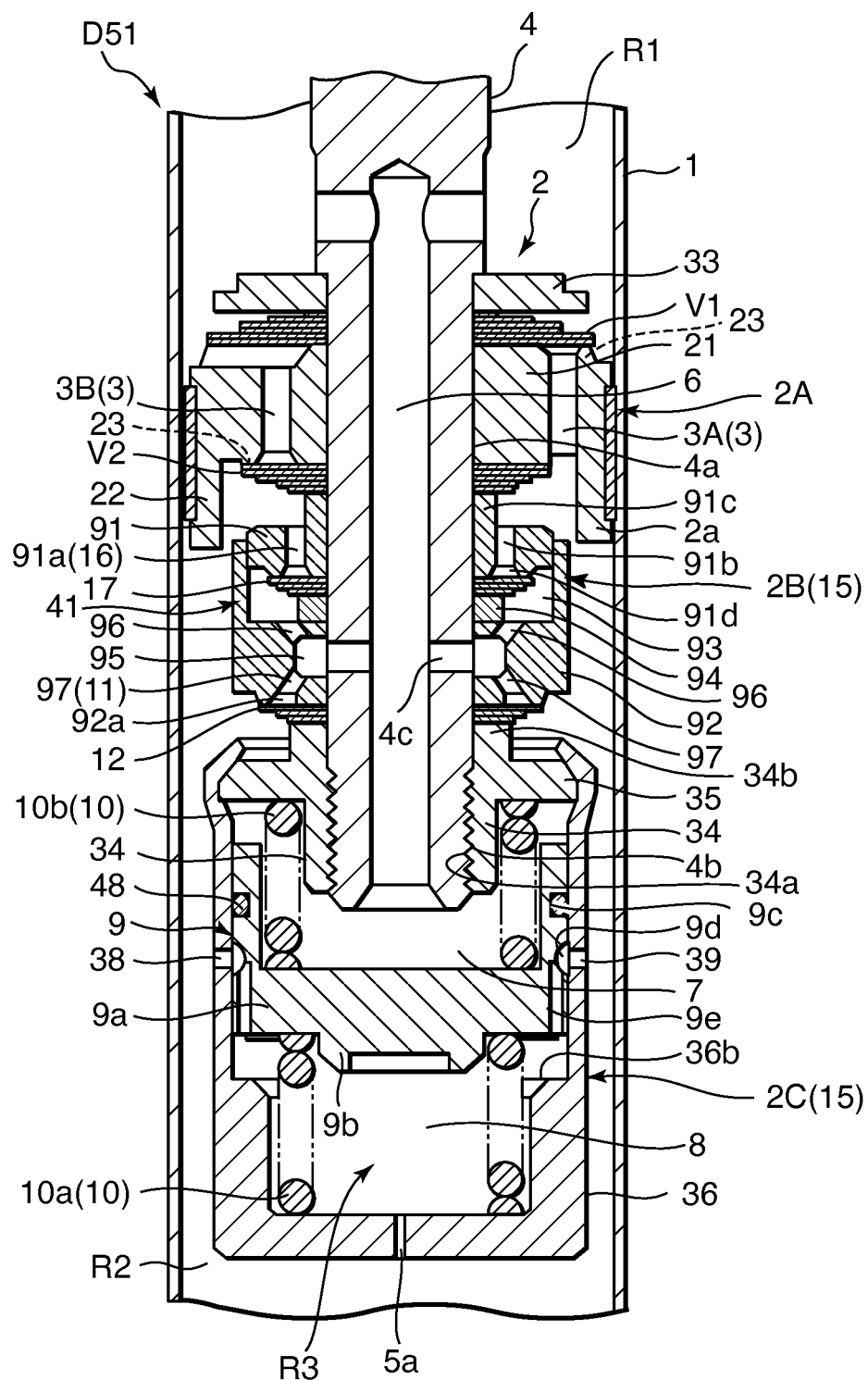
FIG. 18 is an enlarged longitudinal sectional view showing main parts of a damping device according to a fifth embodiment of this invention.
Figure 19:
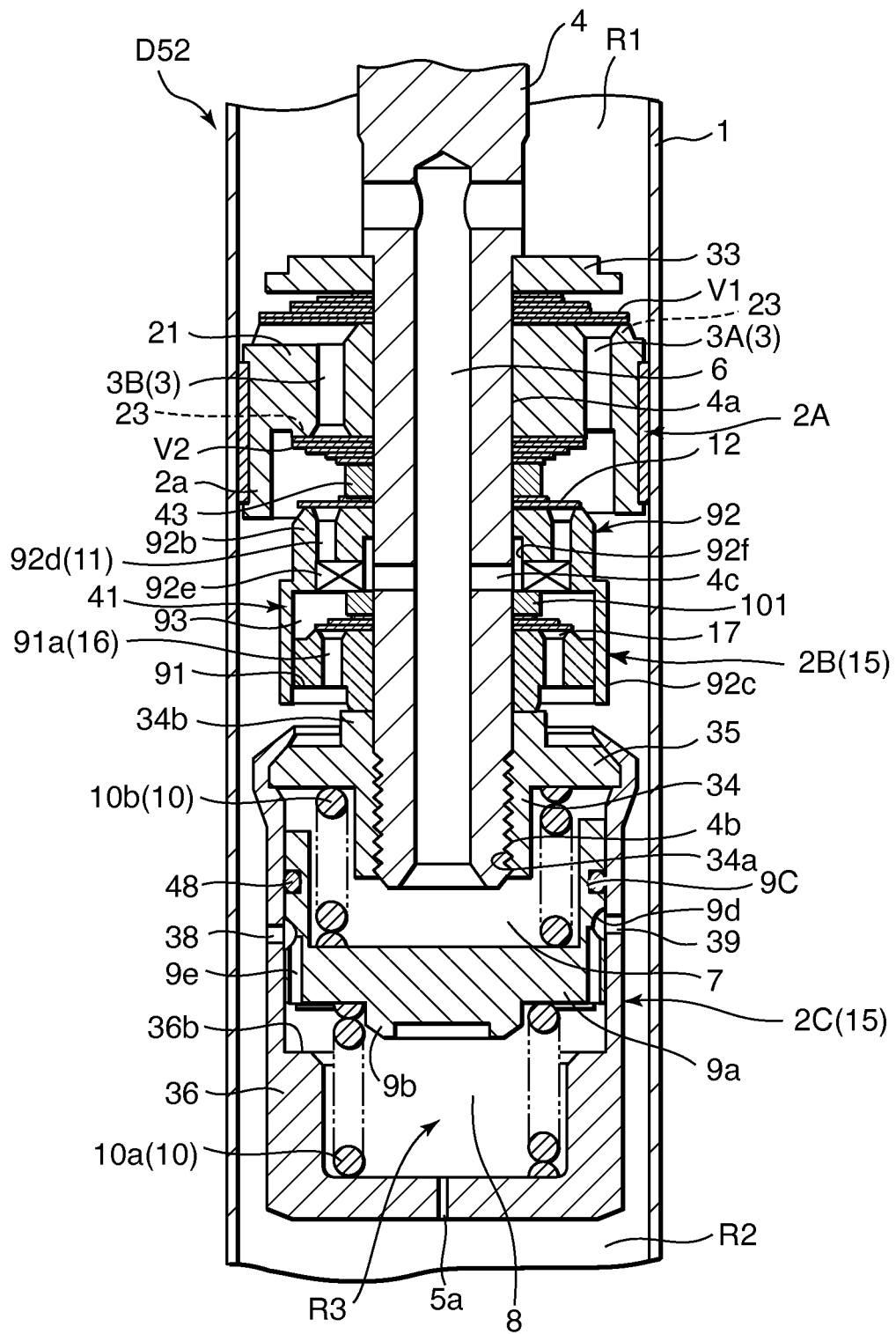
FIG. 19 is similar to FIG. 18, but shows a variation relating to a configuration of a relief valve unit.
Figure 20:
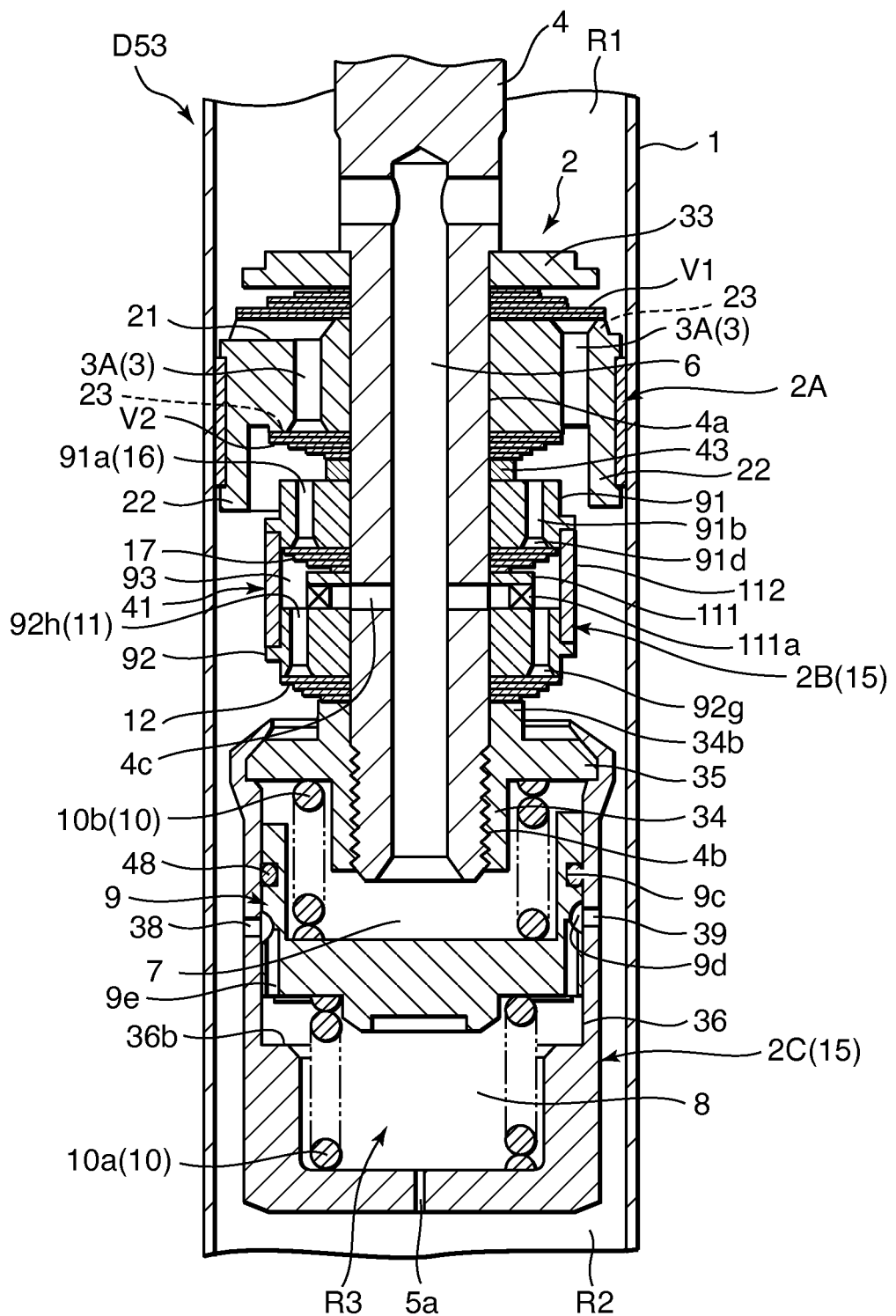
FIG. 20 is similar to FIG. 18, but shows another variation relating to the configuration of the relief valve unit.
Figure 21:
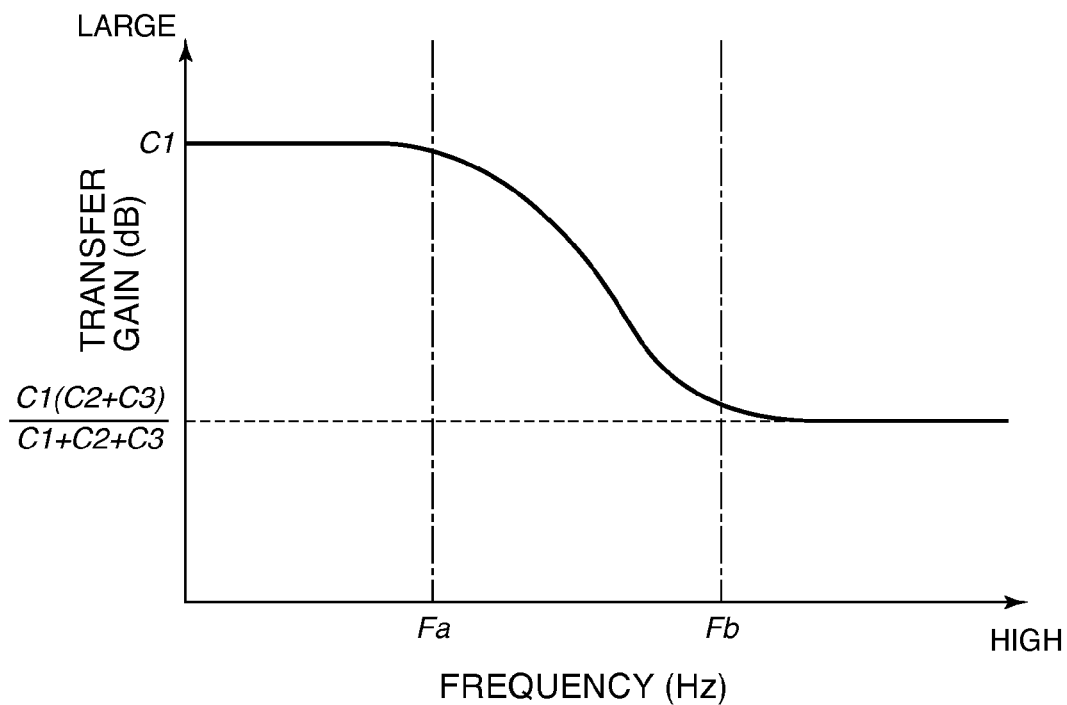
FIG. 21 is a diagram showing a gain characteristic of a frequency transfer function of a differential pressure relative to a working oil flow rate in a damping device according to a prior art.
Figure 22:
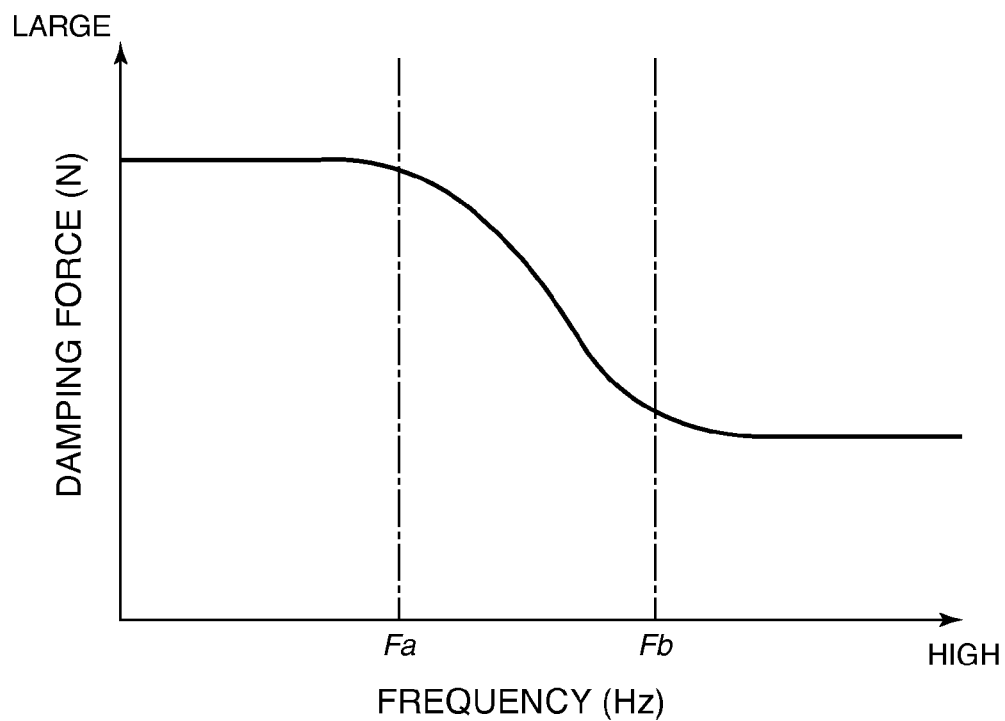
FIG. 22 is a diagram showing a characteristic of the generated damping force relative to the input vibration frequency in the damping device according to the prior art.

Referring to FIGS. 18-20, a fifth embodiment of this invention will be described.

Damping devices D51, D52, D53 according to this embodiment differ from the second embodiment in that the relief valve unit 2B comprises two valve discs 91 and 92. The piston main body 2A and the pressure chamber unit 2C are configured identically to those of the damping devices D21, D22, and D23 according to the second embodiment.

In the damping device D51 shown in FIG. 18, the relief valve unit 2B comprises the valve disc 91, the second relief valve 17, a spacer 94, the valve disc 92, and the first relief valve 12. The small diameter portion 4a of the piston rod 4 penetrates these members. These members are sandwiched between the inner tube 34 of the pressure chamber unit 2C, which is screwed to the small diameter portion 4a, and the laminated leaf valve V2 of the piston main body 2A.

A tubular spacer 91c that is fitted to the small diameter portion 4a of the piston rod 4 so as to project in the axial direction toward the piston main body 2A is formed on the valve disc 91. The valve disc 92 is formed in the shape of a closed-end tube, and a tip end opening portion thereof is fitted to an outer periphery of the valve disc 91. The valve discs 91 and 92 correspond to the valve disc 41 with the second relief valve 17 and the spacer 94 accommodated in a space 93 on an inner side thereof. A seal ring is preferably interposed in a fitting portion between the valve disc 92 and the valve disc 91. Further, the valve disc 91 may be formed in the shape of a closed-end tube having a downwardly oriented tip end, and the tip end opening portion of the valve disc 91 may be fitted to an outer periphery of the valve disc 92.

A plurality of through holes 91a are formed in the valve disc 91 in the axial direction. Respective upper ends of the through holes 91a open into the lower chamber R2. Respective lower ends of the through holes 91a communicate with an annular groove 91d formed in a lower end of the valve disk 91. The second relief valve 17 accommodated in the valve case 41 is constituted by a plurality of laminated leaves, and serves to cut off the annular groove 91d from the space 93 when seated on the lower end of the valve disc 91. The spacer 94 is interposed between the second relief valve 17 and a bottom surface of the valve disc 92 so as to support a central portion of the second relief valve 17.

Similarly to the damping devices D21, D22, and D23 of the second embodiment, the connecting passage 6 that penetrates the small diameter portion 4a to connect the upper chamber R1 to the upper pressure chamber 7 and the through hole 4c that opens onto the outer peripheral surface of the small diameter portion 4a so as to communicate with the connecting passage 6 are formed in the piston rod 4.

An annular groove 95 is formed in an inner peripheral surface of the bottom portion of the valve disc 92, the inner peripheral surface facing the small diameter portion 4a, in a position opposing the through hole 4c. Further, a port 96 that connects the annular groove 95 to the spacer 93 and a port 97 that leads the annular groove 95 to an annular groove 92a formed in the lower end of the valve disc 92 are formed in the bottom portion of the valve disc 92.

The first relief valve 12 is constituted by a plurality of laminated leaves, and a central portion thereof is supported on the upper end 34b of the inner tube 34 so as to cut off the annular groove 92a from the lower chamber R2 when seated on the lower end of the valve disc 92.

During the expansion stroke of the damping device D51, the first relief valve 12 opens in accordance with the pressure of the upper chamber R1, which is exerted thereon via the connecting passage 6, the through hole 4c, the annular groove 95, and the port 97, and as a result, the working oil in the upper chamber R1 flows into the lower chamber R2. During the contraction stroke of the damping device D51, the second relief valve 17 opens in accordance with the pressure of the lower chamber R2, which is exerted thereon via the through hole 91a, and as a result, the working oil in the lower chamber R2 flows into the upper chamber R1 through the through hole 91a, the space 93, the port 96, the annular groove 95, the through hole 4c, and the connecting passage 6.

In the damping device D51, therefore, the port 97 constitutes the first bypass passage 11 and the through hole 91a constitutes the second bypass passage 16.

In the damping device D51, the bypass passages 11 and 16 provided with the relief valves 12 and 17 communicate with the upper chamber R1 and the lower chamber R2 without passing through the hollow portion R3. Accordingly, opening and closing of the relief valves 12 and 17 does not affect the internal pressure of the hollow portion R3, and therefore, when the piston speed is in the low region, a damping force that is dependent on the frequency of the vibration input into the damping device D51 can be generated with stability.

In the damping device D51, in contrast to the damping devices D21, D21, and D23 according to the second embodiment, the relief valves 12 and 17 are both partitioned from the laminated leaf valve V2 by the valve disc 91. Hence, even when the damping device D51 performs a rapid expansion stroke such that working oil is ejected from the laminated leaf valve V2, a resulting jet does not impinge on the relief valve 12 and the relief valve 17 and does not therefore affect opening and closing of the relief valve 12 and the relief valve 17. As a result, the relief valves 12 and 17 operate with stability, enabling the damping device D51 to generate a stable damping force during both the expansion stroke and the contraction stroke.

In the damping device D51, an inner diameter of the skirt 22 of the piston main body 2A is set to be larger than an outer diameter of the valve disc 92, and therefore the valve disc 92 can be inserted into an inner side of the skirt 22. This configuration is favorable for securing a sufficient stroke length in the damping device D51. Further, by providing a sufficient difference between the inner diameter of the skirt 22 and the outer diameter of the valve disc 92, an annular gap formed between the skirt 22 and the valve disc 92 suppresses the flow resistance applied to the flow of working oil. This is favorable for obtaining the set damping characteristic relative to the piston speed and the input vibration frequency.

Referring to FIG. 19, a variation of the fifth embodiment will be described.

The damping device D52 differs from the damping device D51 shown in FIG. 18 in an arrangement of the valve disc 91, the second relief valve 17, the spacer 94, the valve disc 92, and the first relief valve 12 in the relief valve unit 2B. This difference will be described below.

In the damping device D52, the valve disc 92 for seating the first relief valve 12 is disposed on the piston main body 2A side of the valve disc 91 for seating the second relief valve 17, or in other words above the valve disc 91 in the figure.

The small diameter portion 4a of the piston rod 4 penetrates the spacer 43, the first relief valve 12, the valve disc 92, a spacer 101, the second relief valve 17, and the valve disc 91 below the laminated leaf valve V2. These members are sandwiched between the inner tube 34 of the pressure chamber unit 2, which is screwed to the small diameter portion 4a, and the laminated leaf valve V2 of the piston main body 2A.

The valve disc 92 comprises a bottom portion 92b fitted to the outer periphery of the small diameter portion 4a of the piston rod 4, and a tip end portion 92c that projects downward in the figure from the bottom portion. The spacer 43 supports the central portion of the first relief valve 12 such that the first relief valve 12 is seated on the upper end of the valve disc 92.

A through hole 92d formed in the central axis direction of the piston rod 4, a large diameter portion 92f facing the through hole 4c formed in the small diameter portion 4a of the piston rod 4, and a cutout 92e that connects the large diameter portion 92f to the through hole 92d are formed in the bottom portion 92b of the valve disc 92.

The tip end portion 92c of the valve disc 92 is fitted to the outer periphery of the valve disc 91. The valve discs 91 and 92 together constitute the valve case 41 in which the spacer 101 and the second relief valve 17 are accommodated in the inside space 93. The space 93 communicates with the cutout 92e.

The valve disc 91 contacts the upper end 34b of the inner tube 34 of the pressure chamber unit 2c. The through hole 91a is formed in the valve disc 91 in the central axis direction of the piston rod 4. The through hole 91a opens onto the lower chamber R2 from a lower end of the valve disc 91. The second relief valve 17 is supported in the central portion thereof by the spacer 101 and thereby seated on the upper end of the valve disc 91 so as to cut off the through hole 91a from the space 93.

During the expansion stroke of the damping device D52, the first relief valve 12 opens in accordance with the pressure of the upper chamber R1, which is exerted thereon via the connecting passage 6, the through hole 4c, the large diameter portion 92f, the cutout 92e, and the through hole 92d, and as a result, the working oil in the upper chamber R1 flows into the lower chamber R2.

During the contraction stroke of the damping device D52, the second relief valve 17 opens in accordance with the pressure of the lower chamber R2, which is exerted thereon via the through hole 91a, and as a result, the working oil in the lower chamber R2 flows into the upper chamber R1 through the through hole 91a, the space 93, the cutout 92e, the large diameter portion 92f, the through hole 4c, and the connecting passage 6.

In the damping device D52, therefore, the through hole 92d constitutes the first bypass passage 11 and the through hole 91a constitutes the second bypass passage 16.

Referring to FIG. 20, another variation of the fifth embodiment will be described.

The damping device D53 differs from the damping device D51 shown in FIG. 18 in the configuration of the relief valve unit 2B. This difference will be described below.

In the damping device D53, instead of forming the valve disc 92 of the relief valve unit 2B in the shape of a closed-end tube, the valve discs 91 and 92 are integrated via a tubular body 112 fitted to the respective outer peripheries of the valve discs 91 and 92. Flanges that contact respective end portions of the tubular body 112 are formed on the outer peripheries of the valve discs 91 and 92.

The valve case 41, in which a cutout spacer 111 and the second relief valve 17 are accommodated in the inside space 93, is constituted by the valve discs 91 and 92 and the tubular body 112. The cutout spacer 111 is sandwiched between the valve discs 91 and 92.

Similarly to the damping device D51, the through hole 91a and the annular groove 91d are formed in the valve disc 91. The through hole 91a communicates with the lower chamber R2 at all times. The second relief valve 17 is supported by the cutout spacer 111 and thereby seated on the lower end of the valve disc 91 so as to close the annular groove 91d.

The connecting passage 6 and the through hole 4c are formed in the piston rod 4. A cutout 111a that connects the through hole 4c to the space 93 is formed in the cutout spacer 111.

A through hole 92h is formed in the valve disc 92. An annular groove 92g is formed in the lower end of the valve disc 92. One end of the through hole 92h opens onto the space 93, and another end opens onto the annular groove 92g. The first relief valve 12 is constituted by a plurality of laminated leaves, and the central portion thereof is supported by the upper end 34b of the inner tube 34. Thus, the first relief valve 12 is seated on the lower end of the valve disc 92 so as to cut off the annular groove 92g from the lower chamber R2.

During the expansion stroke of the damping device D53, the first relief valve 12 opens in accordance with the pressure of the upper chamber R1, which is exerted thereon via the connecting passage 6, the through hole 4c, the cutout 111a, the space 93, and the through hole 92h, and as a result, the working oil in the upper chamber R1 flows into the lower chamber R2.

During the contraction stroke of the damping device D53, the second relief valve 17 opens in accordance with the pressure of the lower chamber R2, which is exerted thereon via the through hole 91a, and as a result, the working oil in the lower chamber R2 flows into the upper chamber R1 through the through hole 91a, the space 93, the cutout 111a, the through hole 4c, and the connecting passage 6.

In the damping device D53, therefore, the through hole 92h constitutes the first bypass passage 11 and the through hole 91a constitutes the second bypass passage 16.

The damping devices D51, D52, D53 are not dependent on the structure of the pressure chamber unit 2C, and therefore various configurations may be applied to the pressure chamber unit 2C within a range that does not interfere with the relief valve unit 2B.

The contents of Tokugan 2009-281220, with a filing date of Dec. 11, 2009 in Japan, and Tokugan 2010-202718, with a filing date of Sep. 10, 2010 in Japan, are herein incorporated by reference.

Although the invention has been described above with reference to certain embodiments, the invention is not limited to the embodiments described above. Modifications and variations of the embodiments described above will occur to those skilled in the art, within the scope of the claims.

In the embodiments described above, the relief valve unit 2B and the pressure chamber unit 2C are disposed in the lower chamber R2. However, one or both of the relief valve unit 2B and the pressure chamber unit 2C may be disposed in the upper chamber R1.

INDUSTRIAL FIELD OF APPLICATION

With the damping device according to this invention, an increase in damping force generated during a high-speed operation of a piston can be suppressed regardless of a vibration frequency of the piston, and therefore the damping device is suitable for use as a damping device that suppresses vibration in a vehicle.

The embodiments of this invention in which an exclusive property or privilege is claimed are defined as follows:

1. A damping device comprising:
    a cylinder filled with a fluid;
    a piston that is accommodated in the cylinder to be free to slide and divides an interior of the cylinder into a first working chamber and a second working chamber;
    a damping force generating element that connects the first working chamber and the second working chamber;
    a free piston;
    a hollow portion partitioned by the free piston into a first pressure chamber and a second pressure chamber, the hollow portion having a central axis;
    a first connecting passage that connects the first working chamber and the first pressure chamber;
    a second connecting passage that connects the second working chamber and the second pressure chamber;
    a bypass passage that connects the first working chamber and the second working chamber; and
    a relief valve that is provided in the bypass passage and allows the fluid to flow from the first working chamber into the second working chamber when a differential pressure between the first working chamber and the second working chamber exceeds a relief pressure,
    wherein the piston comprises
        a piston main body that slides along the cylinder,
        a relief valve unit that is adjacent to the piston main body on a second working chamber side, and
        a pressure chamber unit that is adjacent to the relief valve unit on an opposite side to the piston main body,
    wherein the piston main body includes the damping force generating element, the relief valve unit includes the bypass passage and the relief valve, and the hollow portion is formed in an interior of the pressure chamber unit,
    wherein the damping force generating element and the relief valve are provided in parallel with each other with respect to the connection between the first working chamber and the second working chamber to cause a fluid, that flows out from the first working chamber through the relief valve, to directly flow into the second working chamber, and to cause a fluid, that flows out from the first working chamber through the damping force generating element, to directly flow into the second working chamber, and
    further wherein the free piston is supported in a neutral position in the hollow portion from which the free piston is displaceable in two opposite directions along the central axis in response to a fluid flow in the first connecting passage and the second connecting passage without affecting a flow of the fluid that flows out from the first working chamber through the relief valve.

2. The damping device as defined in claim 1, wherein the damping force generating element comprises a leaf valve and an orifice.

3. The damping device as defined in claim 1, wherein the bypass passage is a first bypass passage, and the relief valve is a first relief valve, the damping device further comprising:
    a second bypass passage that connects the first working chamber and the second working chamber; and
    a second relief valve that is provided in the second bypass passage and allows the fluid to flow from the second working chamber into the first working chamber when a differential pressure between the second working chamber and the first working chamber exceeds a relief pressure.

4. The damping device as defined in claim 3, wherein the second bypass passage and the second relief valve are provided in the relief valve unit.

5. The damping device as defined in claim 4, further comprising a piston rod that penetrates the piston main body and the relief valve unit and is screwed to the pressure chamber unit so as to integrate the piston main body, the relief valve unit, and the pressure chamber unit.

6. The damping device as defined in claim 1, further comprising an orifice provided in the second connecting passage.

7. The damping device as defined in claim 1, further comprising a spring that elastically supports the free piston.

8. The damping device as defined in claim 5, wherein
the first connecting passage is formed on an inner side of the piston rod,
the piston rod comprises a through hole that communicates with the first connecting passage and opens onto an outer periphery of the piston rod,
the relief valve unit comprises a valve disc that is fitted to the outer periphery of the piston rod, the first bypass passage having an outlet that faces the second working chamber being formed in the valve disc so as to communicate with the through hole, and
the first relief valve is provided in the outlet of the first bypass passage.

9. The damping device as defined in claim 5, wherein the pressure chamber unit comprises an inner tube screwed to the piston rod and an outer tube fixed to an outer periphery of the inner tube.

10. The damping device as defined in claim 5, wherein the pressure chamber unit and the relief valve unit comprise a shared housing that is screwed to the piston rod.

11. The damping device as defined in claim 1, wherein
the relief valve is constituted by a valve that allows the fluid to flow through the bypass passage from the first working chamber toward the second working chamber when a pressure of the first working chamber exceeds a pressure of the second working chamber and the differential pressure between the first working chamber and the second working chamber equals or exceeds a first relief pressure, and allows the fluid to flow through the bypass passage from the second working chamber toward the first working chamber when the pressure of the second working chamber exceeds the pressure of the first working chamber and the differential pressure between the second working chamber and the first working chamber equals or exceeds a second relief pressure.

12. The damping device as defined in claim 11, wherein the relief valve comprises:
a ring-shaped leaf;
a support member that supports an outer periphery of the leaf against a single direction flow through the bypass passage; and
another support member that supports an inner periphery of the leaf against an opposite direction flow through the bypass passage.

13. The damping device as defined in claim 3, the first bypass passage and the second bypass passage connect the first working chamber and the second working chamber in parallel with each other.

14. The damping device as defined in claim 13, wherein
the piston comprises the piston main body that is capable of sliding along the cylinder, the damping force generating element, the relief valve unit that is adjacent to the piston main body on the second working chamber side thereof, and the pressure chamber unit that is adjacent to the relief valve unit on an opposite side of the relief valve unit to the piston main body and has the hollow portion formed in an interior thereof,
the damping device further comprises a piston rod that penetrates the piston main body and the relief valve unit and is screwed to the pressure chamber unit so as to integrate the piston main body, the relief valve unit, and the pressure chamber unit,
the first connecting passage is formed inside the piston rod,
the relief valve unit comprises a valve disc that is penetrated by the first bypass passage and the second bypass passage,
an inlet of the first bypass passage and an outlet of the second bypass passage are connected to the first connecting passage,
an outlet of the first bypass passage and an inlet of the second bypass passage are connected to the second working chamber,
the first relief valve is provided in the outlet of the first bypass passage, and
the second relief valve is provided in the outlet of the second bypass passage.

15. The damping device as defined in claim 14, wherein
the damping device includes a cylindrical cutout spacer that supports the second relief valve and comprises a cutout,
the piston rod comprises a through hole that communicates with the first connecting passage and opens onto the outer periphery of the piston rod,
the relief valve unit further comprises a valve case that is attached to an outer periphery of the valve disc so as to surround the through hole,
the second relief valve is constituted by laminated leaves,
the second relief valve and the cylindrical cutout spacer are accommodated inside the valve case, and
the inlet of the first bypass passage and the outlet of the second bypass passage are connected to the through hole via the cutout.

16. The damping device as defined in claim 15, wherein the first bypass passage and the second bypass passage penetrate the valve disc diagonally such that the outlet of the first bypass passage is positioned closer to the piston rod than the inlet of the first bypass passage and the outlet of the second bypass passage is positioned closer to the piston rod than the inlet of the second bypass passage.

17. The damping device as defined in claim 15, wherein
the first bypass passage and the second bypass passage are formed concentrically, centering on the piston rod,
a valve seat of the first relief valve is formed in a petal shape that varies a diameter according to an angle to cover the outlet of the first bypass passage while avoiding the inlet of the second bypass passage, and
a valve seat of the second relief valve is formed in a petal shape that varies a diameter according to an angle to avoid the inlet of the first bypass passage while covering the outlet of the second bypass passage.

18. The damping device as defined in claim 15, wherein
the first bypass passage is formed in a position that is further removed from the piston rod in a radial direction than the second bypass passage, and
the first relief valve comprises a hole portion in a site corresponding to the inlet of the second bypass passage.

19. The damping device as defined in claim 18, wherein
the first relief valve comprises a plurality of laminated leaves covering the inlet of the second bypass passage, and
a hole portion is formed into an arch-shape and formed in a part of the leaves, other than a leaf that is furthest removed from the inlet of the second bypass passage in a central axis direction of the piston rod.

20. The damping device as defined in claim 14, further comprising a valve case or a housing attached to the outer periphery of the valve disc so as to face the inlet of the first bypass passage and the outlet of the second bypass passage, wherein the first connecting passage is formed inside the piston rod so as to open onto the first pressure chamber, the relief valve unit comprises a space that is defined by the valve case or the housing, and the pressure chamber unit further comprises a through hole that connects the first pressure chamber to the space.

21. The damping device as defined in claim 20, wherein the pressure chamber unit comprises an inner tube screwed to the piston rod and an outer tube fixed to an outer periphery of the inner tube, the relief valve unit comprises the valve case, which comprises a tubular body that is attached to the outer periphery of the valve disc and the outer periphery of the inner tube, and the through hole is formed to penetrate the inner tube.

22. The damping device as defined in claim 21, wherein the tubular body comprises a fitting portion that is fitted to the outer periphery of the inner tube, and the relief valve unit further comprises a plate having a larger diameter than an end surface of the inner tube, which is fixed to the end surface of the inner tube to prevent the fitting portion from falling off the outer periphery of the inner tube, and formed with a hole portion that connects the through hole to the space.

23. The damping device as defined in claim 20, wherein the pressure chamber unit comprises:

a partition wall portion screwed to the piston rod;

a first extension portion that extends from the partition wall portion toward the relief valve unit and is attached to the outer periphery of the valve disc; and a second extension portion that extends between the partition wall portion and the relief valve unit in an opposite direction and has the hollow portion formed on an inner side thereof, the housing is constituted by the first extension portion, and the through hole is formed to penetrate the partition wall portion.

24. The damping device as defined in claim 13, wherein the piston comprises the piston main body that is capable of sliding along the cylinder and comprises the damping force generating element, the relief valve unit that is adjacent to the piston main body on the second working chamber side thereof, and the pressure chamber unit that is adjacent to the relief valve unit on an opposite side of the relief valve unit to the piston main body and has the hollow portion formed in an interior thereof, the damping device further comprises a piston rod that penetrates the piston main body and the relief valve unit and is screwed to the pressure chamber unit so as to integrate the piston main body, the relief valve unit, and the pressure chamber unit, the first connecting passage is formed inside the piston rod, the relief valve unit comprises a first valve disc in which the first bypass passage is formed and a second valve disc in which the second bypass passage is formed, an inlet of the first bypass passage and an outlet of the second bypass passage are connected to the first connecting passage, an outlet of the first bypass passage and an inlet of the second bypass passage are connected to the second working chamber, the first relief valve is provided in the outlet of the first bypass passage, and the second relief valve is provided in the outlet of the second bypass passage.

25. The damping device as defined in claim 24, wherein the piston rod comprises a through hole that communicates with the first connecting passage and opens onto an outer periphery of the piston rod, and the relief valve unit further comprises a valve case that is constituted by the first valve disc and the second valve disc and defines, on an inner side thereof, a space that communicates with the through hole.

26. The damping device as defined in claim 25, wherein the second relief valve is accommodated inside the valve case, the second bypass passage is connected to the space, and the first relief valve is disposed on an outer side of the valve case.

27. The damping device as defined in claim 26, wherein the first relief valve is disposed between the first valve disc and the pressure chamber unit, and the inlet of the second bypass passage opens onto the second working chamber while facing the piston main body.

28. The damping device as defined in claim 26, wherein the first relief valve is disposed between the first valve disc and the piston main body, and the inlet of the second bypass passage opens onto the second working chamber while facing the pressure chamber unit.

29. The damping device as defined in claim 28, wherein the first valve disc comprises a cutout that connects the through hole to the space.

30. The damping device as defined in claim 27, wherein an annular groove facing the through hole is formed on an inner side of the first valve disc, and the through hole is connected to the space via the annular groove.

31. The damping device as defined in claim 27, further comprising a cylindrical cutout spacer having a cutout and provided inside the valve case to support the second relief valve, wherein the through hole is connected to the space via the cutout.

32. The damping device as defined in claim 23, further comprising a grip portion formed on an outer periphery of the second extension portion so as to be gripped by a tool.

33. The damping device as defined in claim 1, wherein the piston main body further comprises a skirt that slides on an inner periphery of the cylinder and a part of the relief valve unit is located on an inner side of the skirt.

* * * * *